INVENTOR.
LYLE E. PACKARD,
ATTORNEYS.

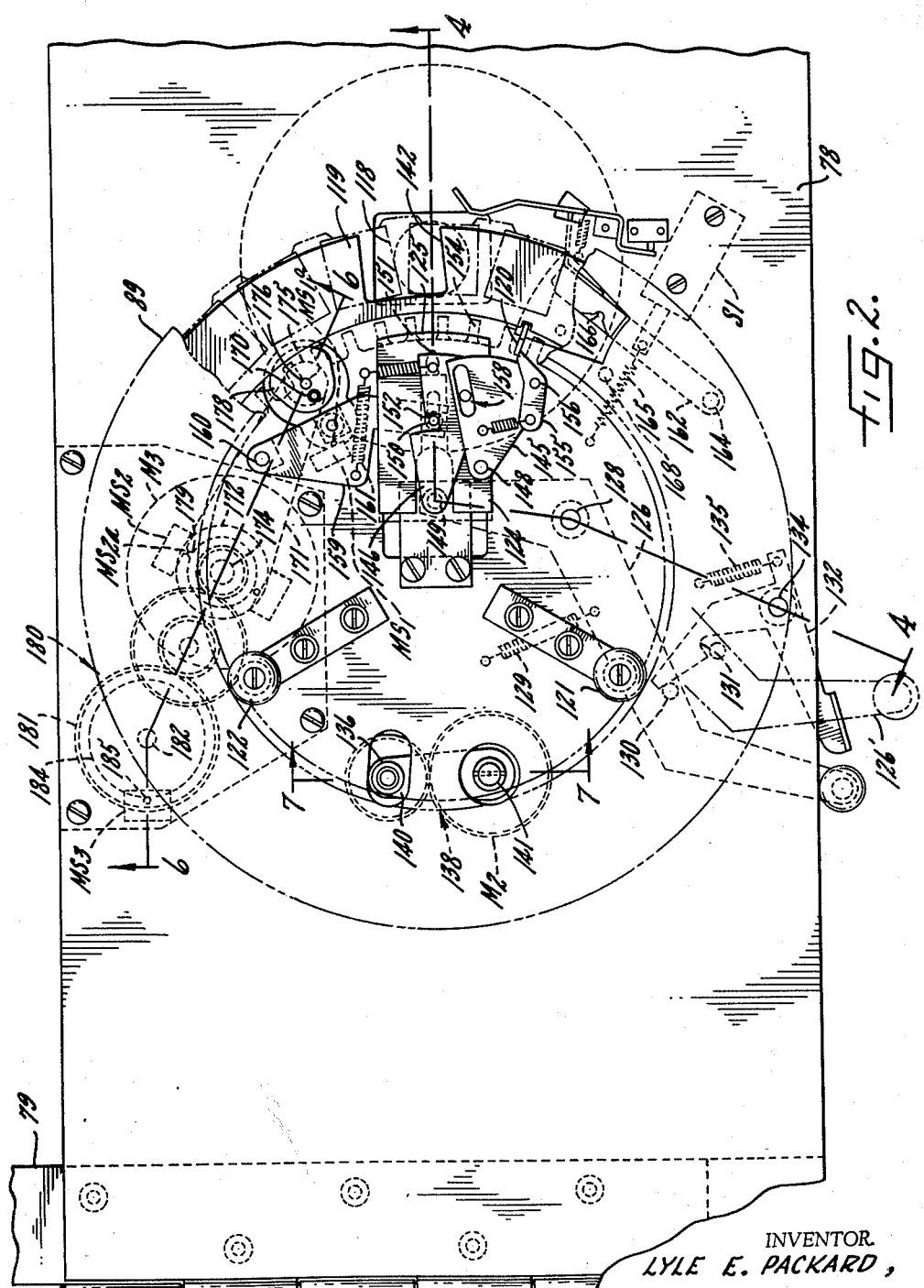

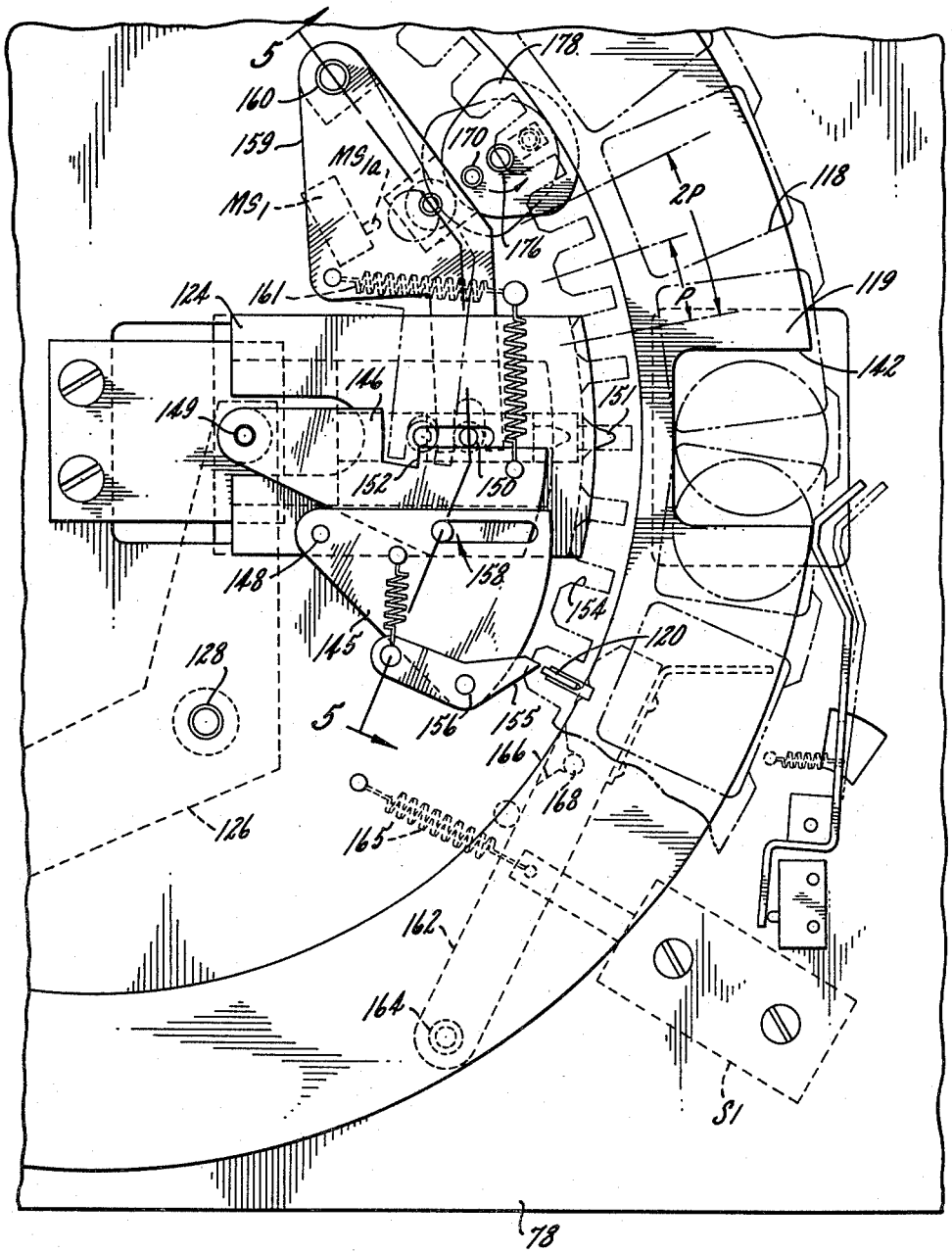

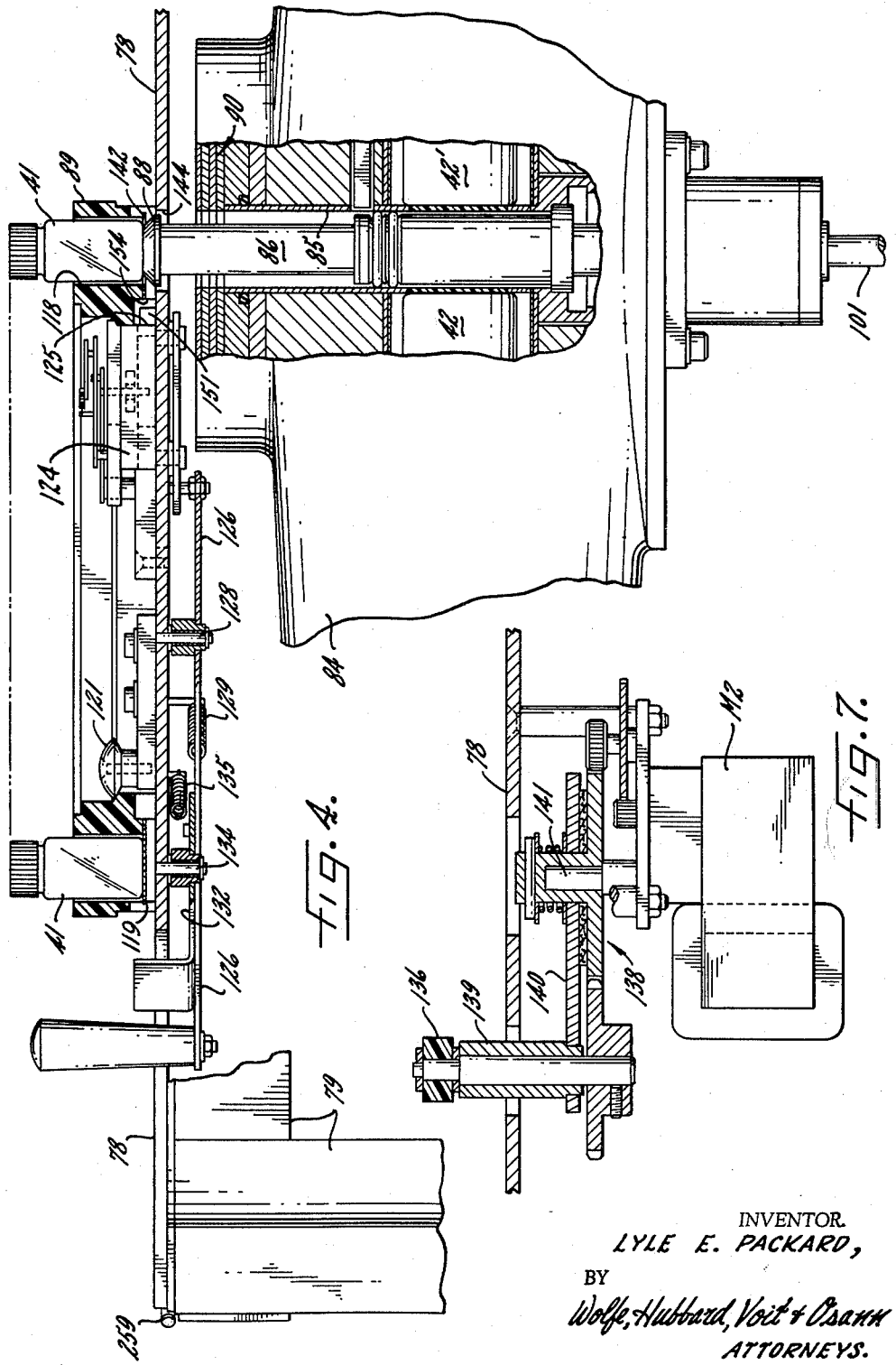

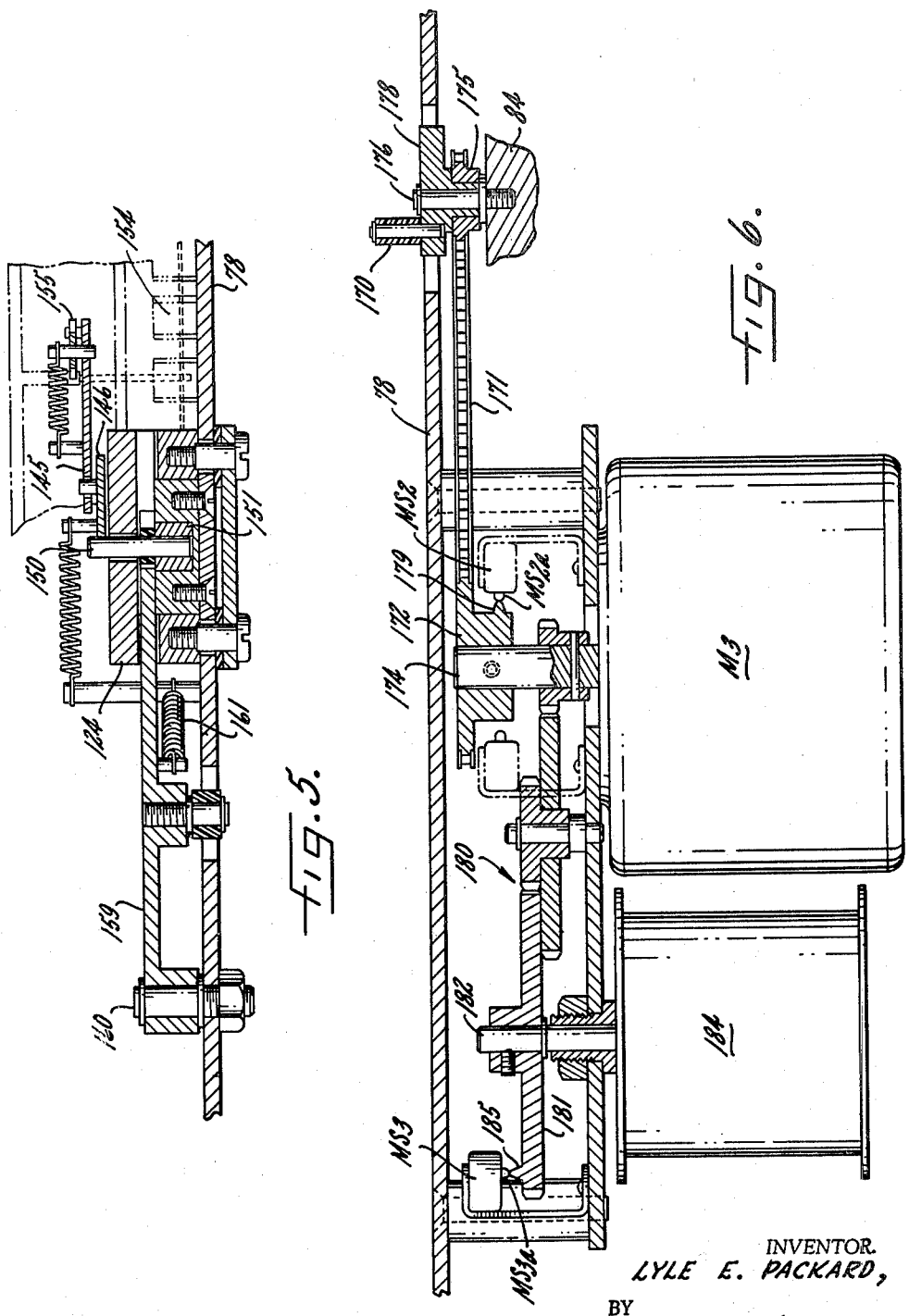

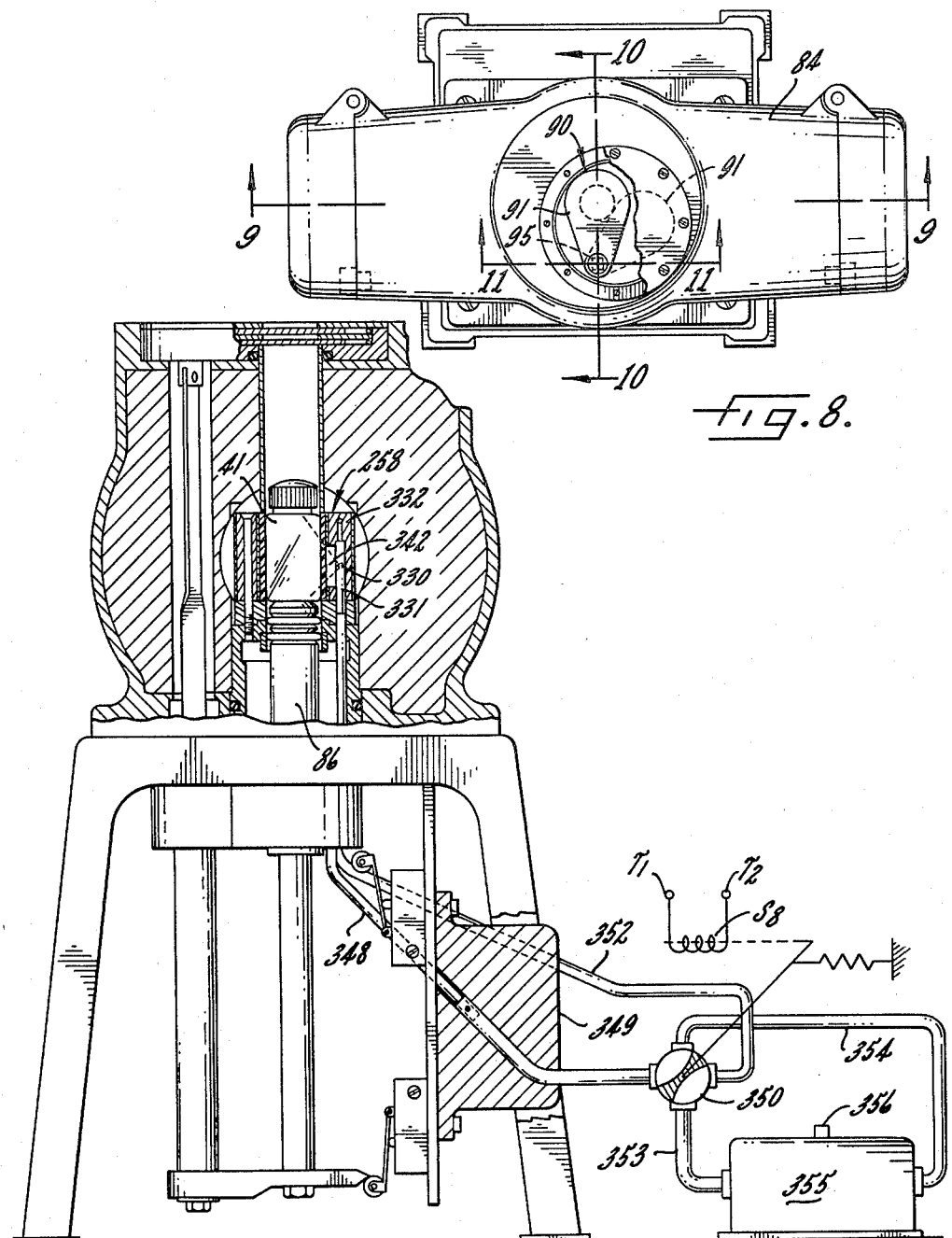

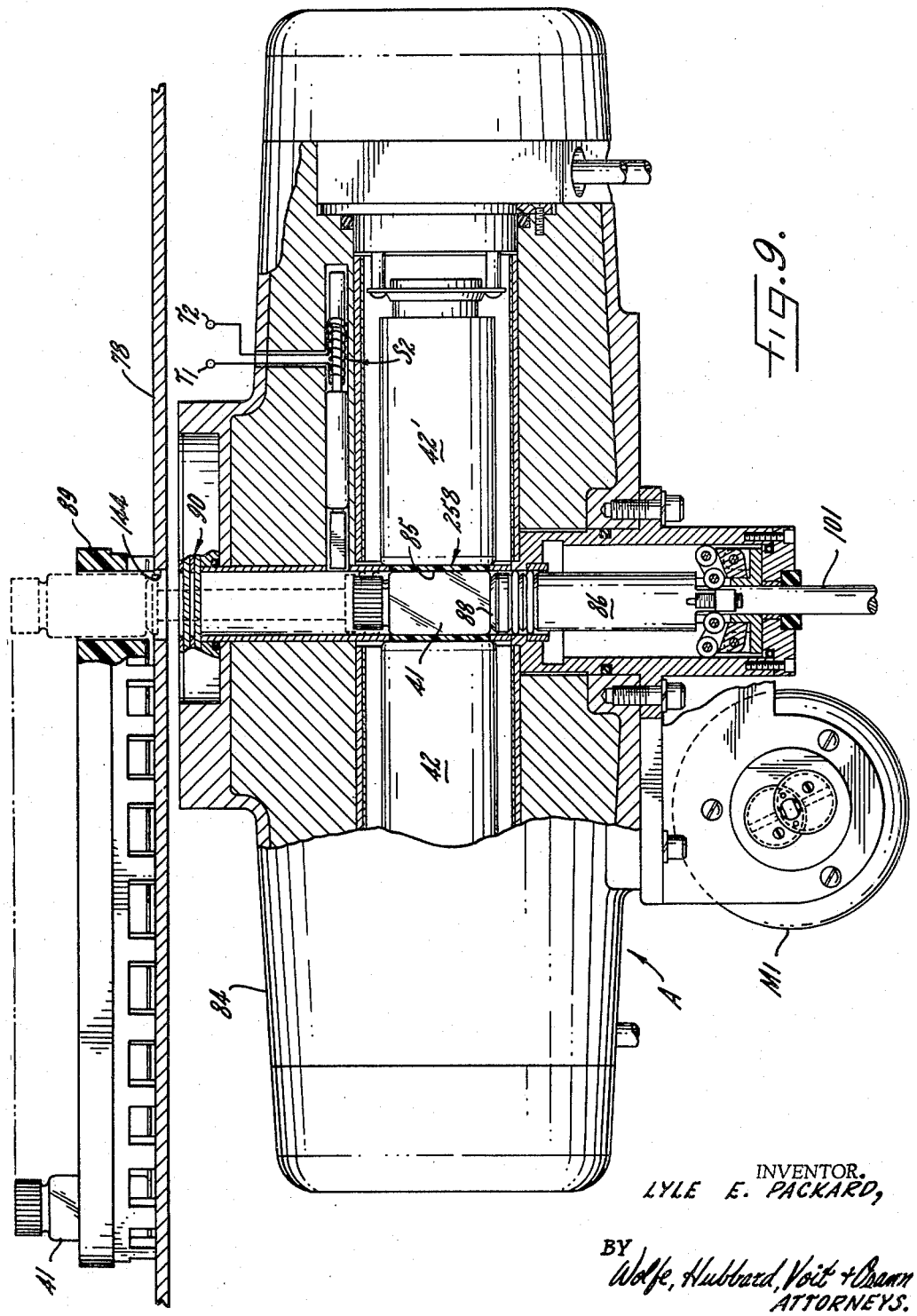

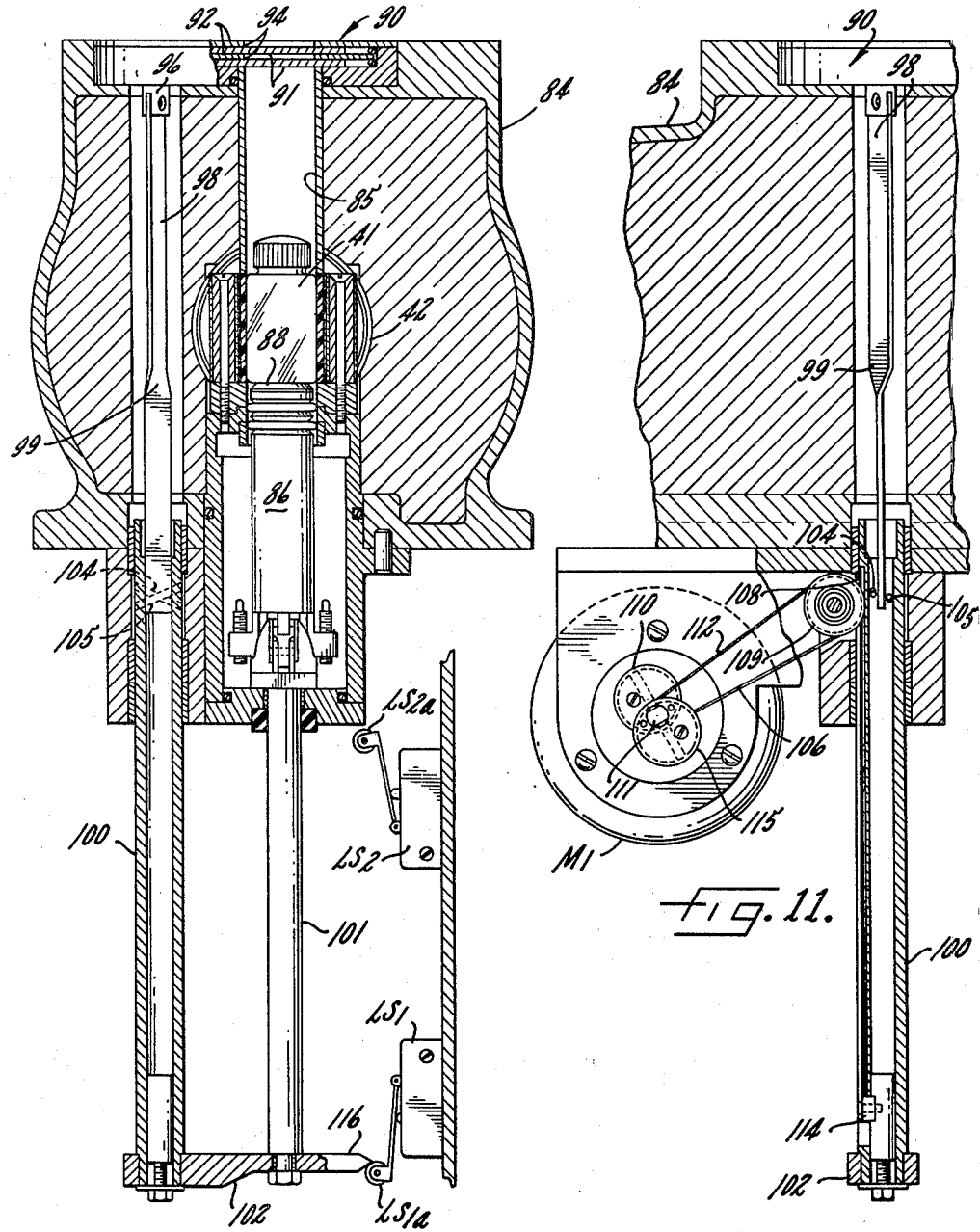

INVENTOR.
LYLE E. PACKARD,
BY Wolfe, Hubbard, Voit + Osann
ATTORNEYS.

June 8, 1965 L. E. PACKARD 3,188,468
METHOD AND APPARATUS FOR AUTOMATIC STANDARDIZATION
IN LIQUID SCINTILLATION SPECTROMETRY
Filed June 18, 1964 19 Sheets-Sheet 10

INVENTOR.
LYLE E. PACKARD,
BY
Wolfe, Hubbard, Voit & Osann
ATTORNEYS.

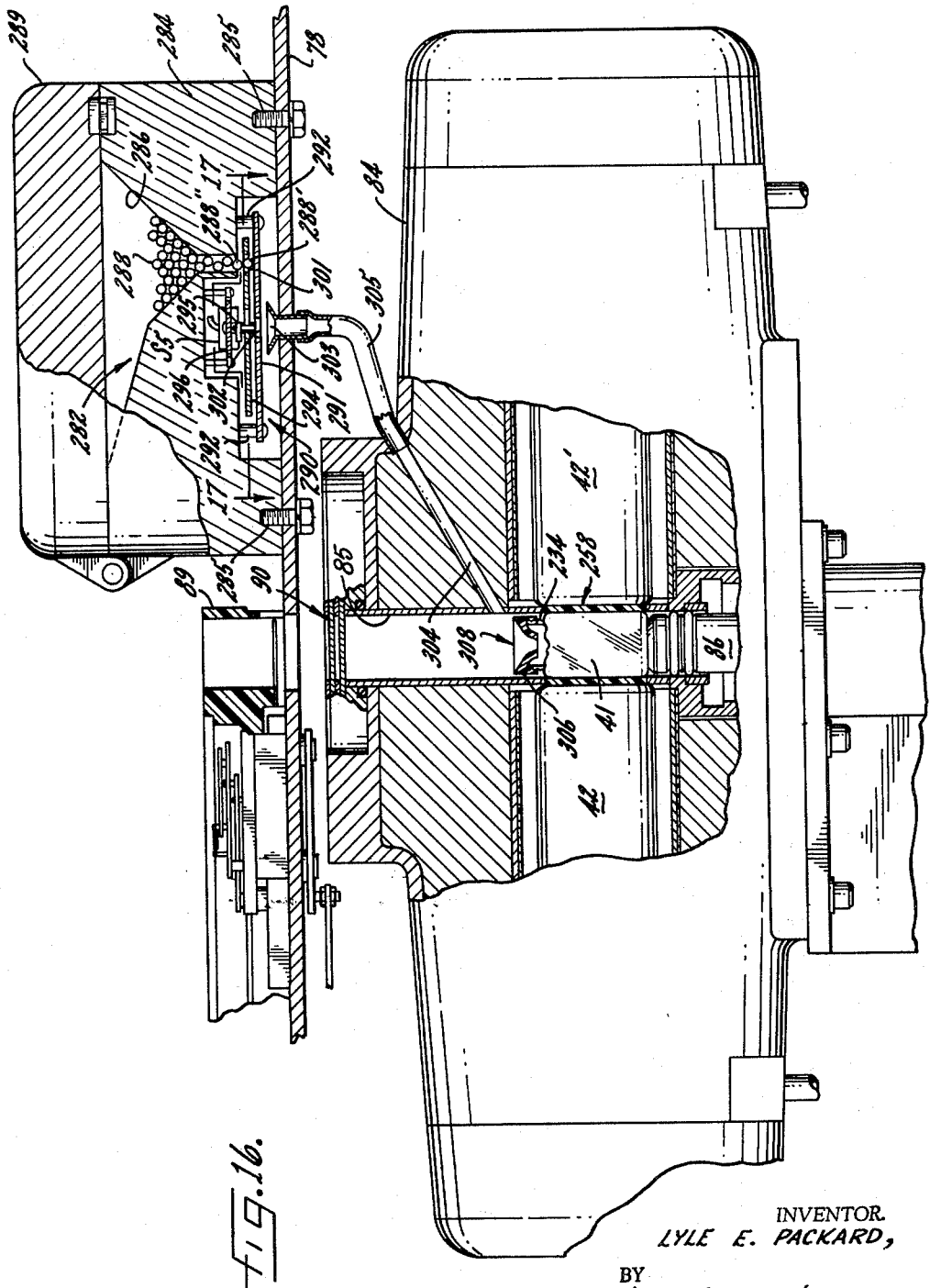

June 8, 1965

L. E. PACKARD 3,188,468

METHOD AND APPARATUS FOR AUTOMATIC STANDARDIZATION
IN LIQUID SCINTILLATION SPECTROMETRY

Filed June 18, 1964

INVENTOR.
LYLE E. PACKARD,
BY
Wolfe, Hubbard, Voit + Osann
ATTORNEYS.

INVENTOR
LYLE E. PACKARD
BY
Wolfe, Hubbard, Voit & Osann
ATTORNEYS.

June 8, 1965 L. E. PACKARD 3,188,468
METHOD AND APPARATUS FOR AUTOMATIC STANDARDIZATION
IN LIQUID SCINTILLATION SPECTROMETRY
Filed June 18, 1964 19 Sheets-Sheet 14

INVENTOR.
LYLE E. PACKARD,
BY
Wolfe, Hubbard, Voit & Osann
ATTORNEYS.

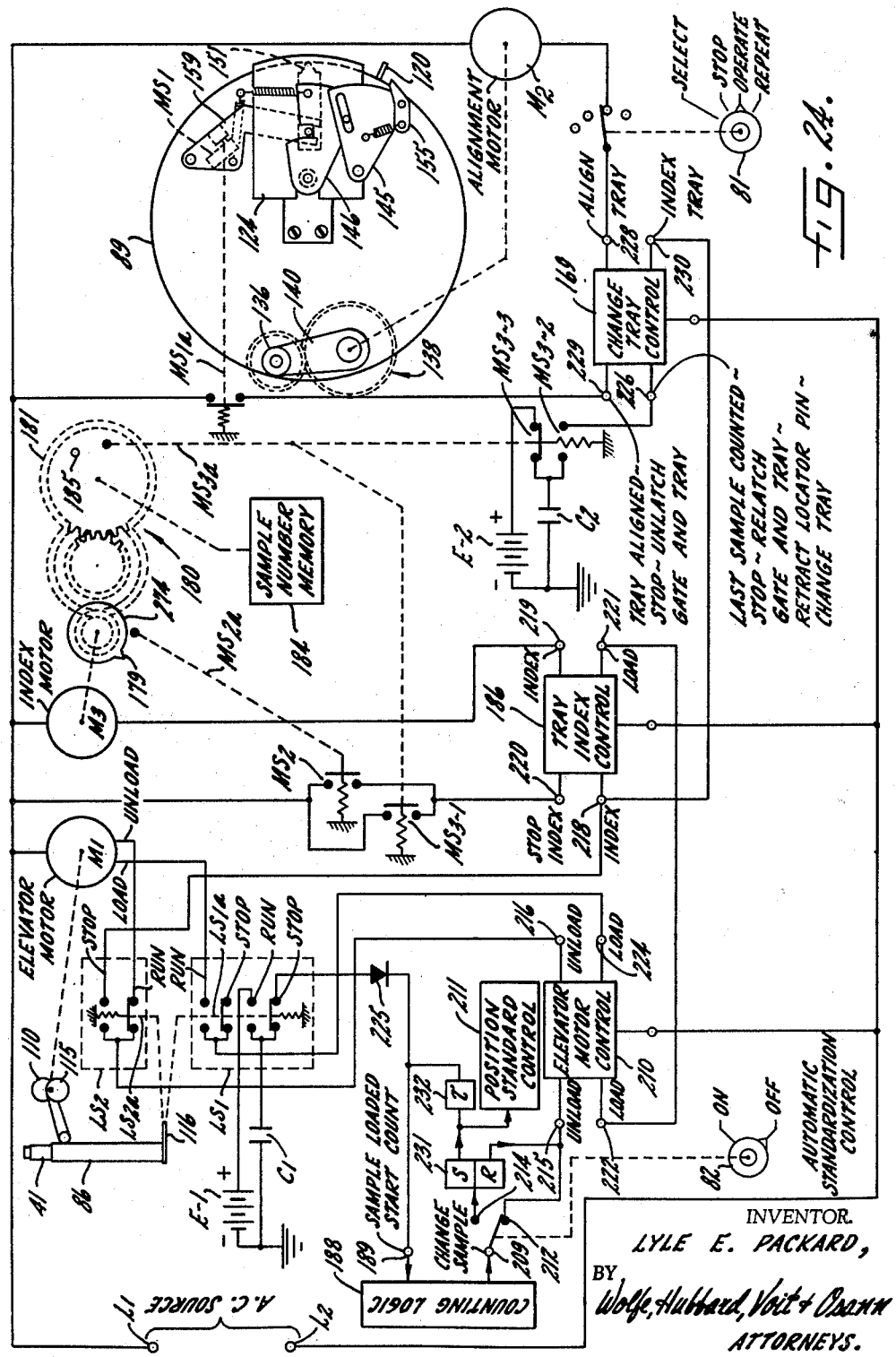

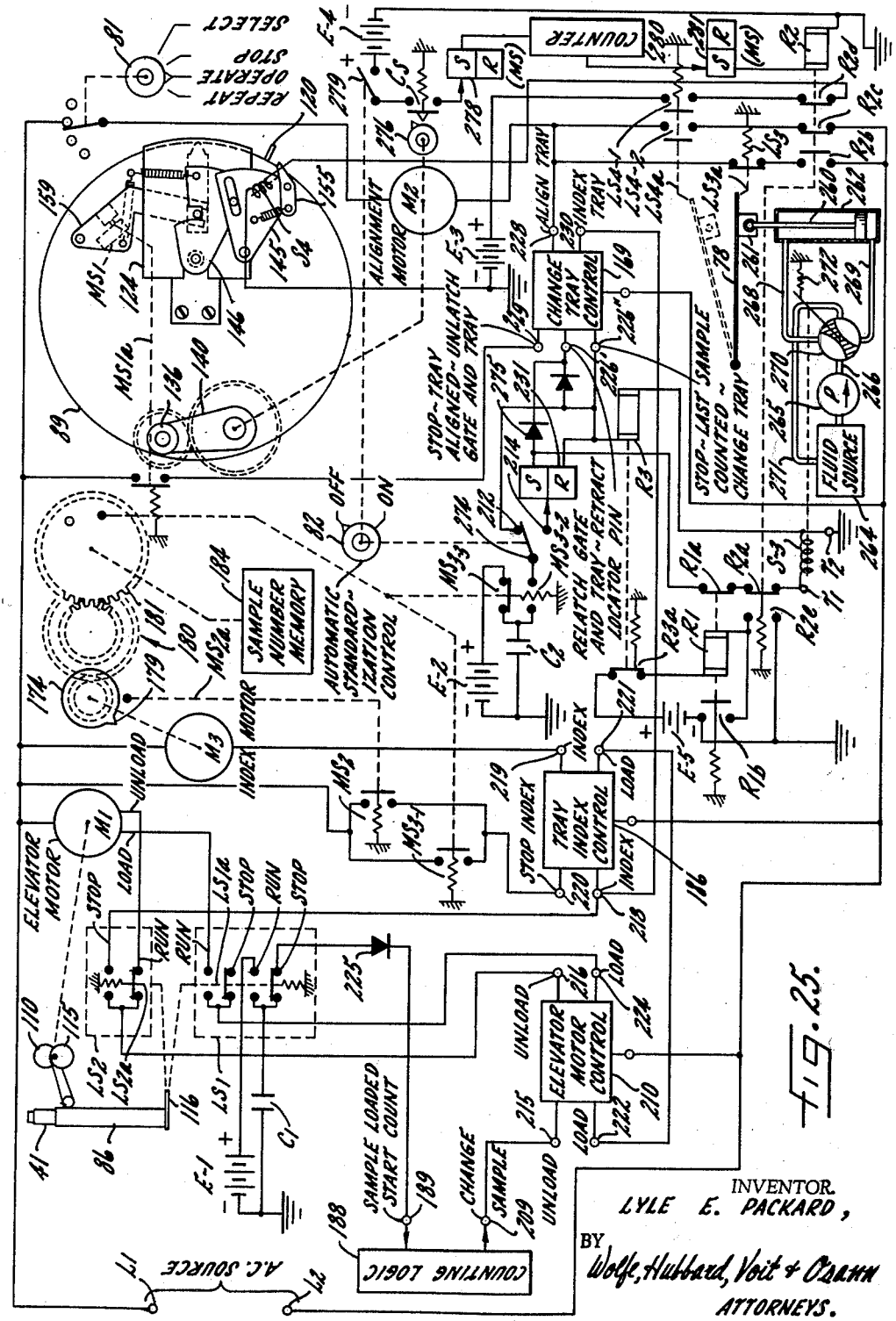

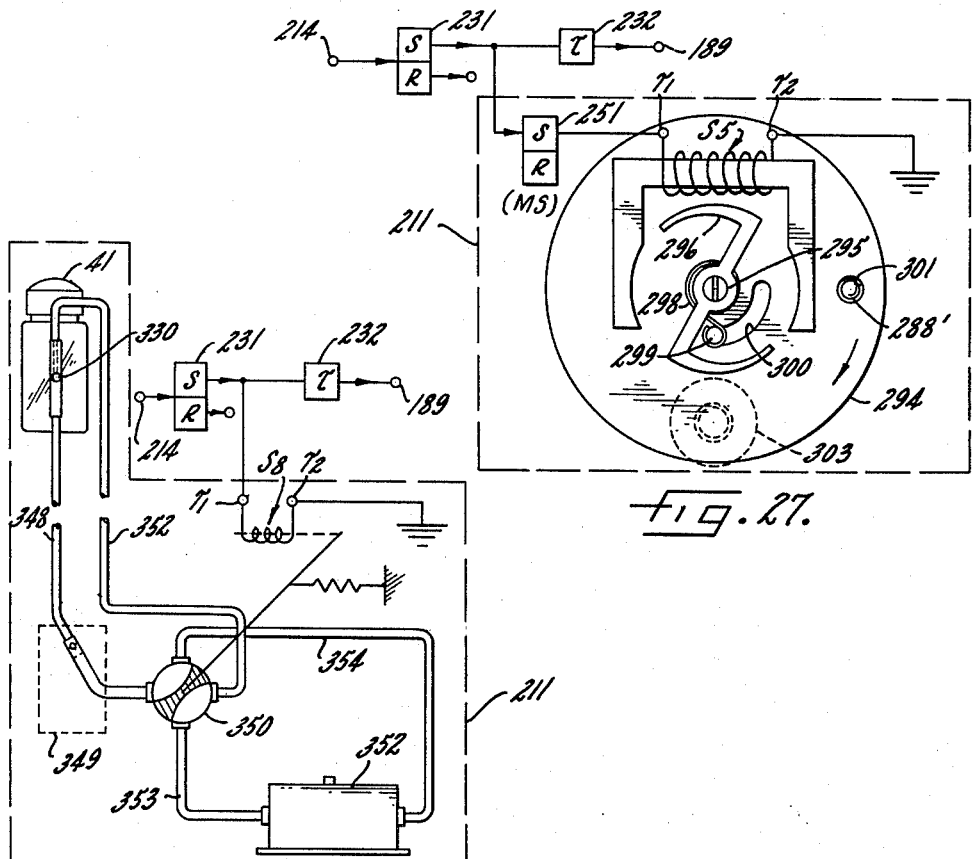
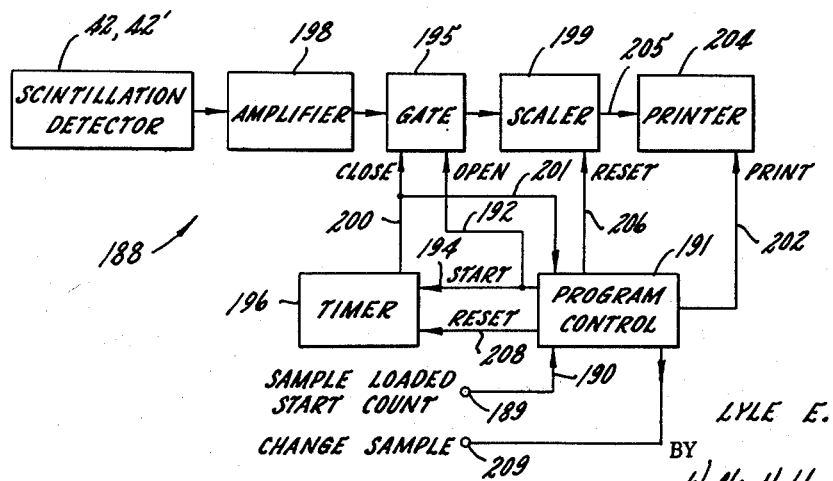

June 8, 1965   L. E. PACKARD   3,188,468
METHOD AND APPARATUS FOR AUTOMATIC STANDARDIZATION
IN LIQUID SCINTILLATION SPECTROMETRY
Filed June 18, 1964   19 Sheets-Sheet 18

INVENTOR.
LYLE E. PACKARD,
BY
Wolfe, Hubbard, Voit & Osann
ATTORNEYS.

June 8, 1965     L. E. PACKARD     3,188,468
METHOD AND APPARATUS FOR AUTOMATIC STANDARDIZATION
IN LIQUID SCINTILLATION SPECTROMETRY
Filed June 18, 1964     19 Sheets-Sheet 19
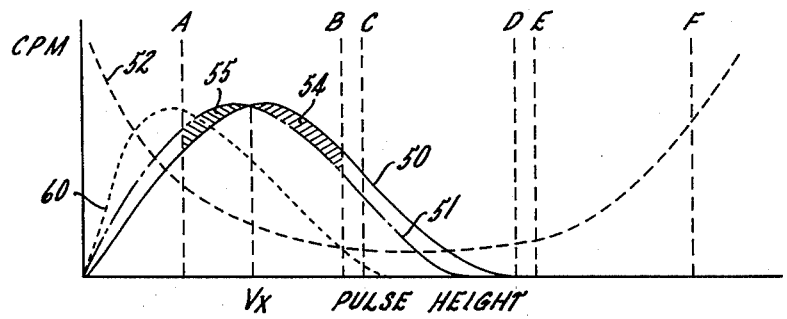
_Fig. 32._
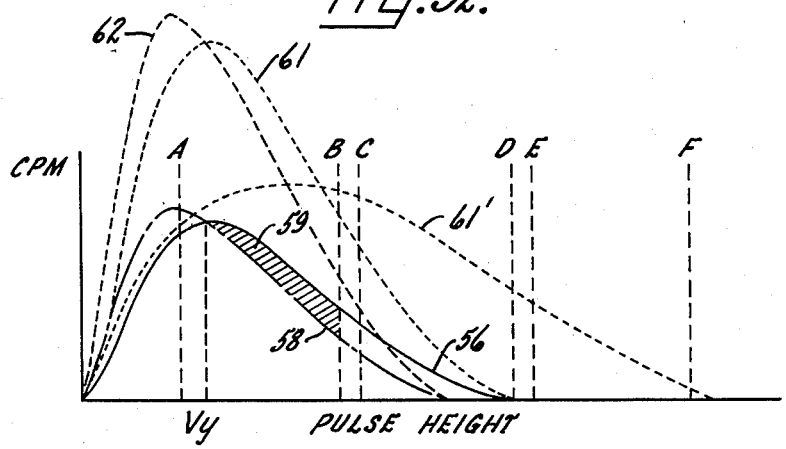
_Fig. 33._
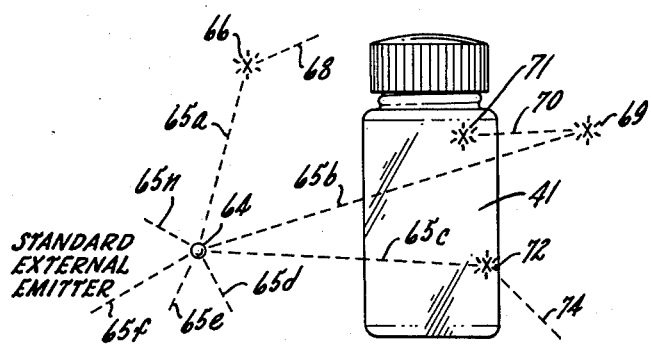
_Fig. 34._
INVENTOR.
LYLE E. PACKARD,
BY
*Wolfe, Hubbard, Voit & Osann*
ATTORNEYS.

United States Patent Office 3,188,468
Patented June 8, 1965

3,188,468
METHOD AND APPARATUS FOR AUTOMATIC STANDARDIZATION IN LIQUID SCINTILLATION SPECTROMETRY
Lyle E. Packard, Hinsdale, Ill., assignor to Packard Instrument Company, Inc., Downers Grove, Ill., a corporation of Illinois
Filed June 18, 1964, Ser. No. 376,000
36 Claims. (Cl. 250—71.5)

The present invention relates in general to liquid scintillation spectral analysis of test samples containing one or more radioactive isotopes disposed in a liquid scintillator and, more particularly, to spectral analysis techniques and equipment which are wholly automaic in operation and which permit of corrective compensation for the effects of quenching and other phenomena such as instrument drift or line voltage drift, all of which tend to reduce counting efficiency. In its principal aspects, the invention is concerned with improved methods and apparatus for automatically exposing each of a plurality of radioactive test samples (either prior to or subsequent to measurement of the energy spectrum of the isotope contained therein) to a known quantum per unit time of radiant energy emanating from a standard source characterized by its ability to produce in the liquid scintillator an observable spectrum of light energy typical of, for example, a beta emitter.

It is a general aim of the present invention to provide improved radioactivity spectrometry equipment and methods which permit of corrective compensation for the effect of quenching and similar phenomena that cause variation between the actual quantum of light photons emitted by any given scintillation and that detected, or variation in the total number of scintillations occurring in any given time period and the total number of scintillations detected in that period.

More particularly stated, it is an object of the invention to provide improved methods and apparatus for automatically exposing a test sample including a vial containing a liquid scintillator and a radioactive isotope to a source of impinging radiation, which source may, merely by way of example, constitute an emitter of alpha, beta, gamma, X-ray or other similar ionizing radiations, and wherein the source comprises a known standard characterized by its ability to produce a predetermined known energy spectrum in the form of scintillations occurring in the scintillator, thereby permitting comparison of the observed count of scintillations resulting from the composite effect of ionizing radiation emitted from the isotope and the source with the observed count of scintillations resulting from the isotope alone.

An ancillary object of the invention is to provide improved methods and apparatus for automatically placing a normally ineffective standard radiation emitter capable of producing a known energy spectrum in operative relation to a radioactive test sample containing a liquid scintillator and characterized in that the scintillations occurring in the liquid scintillator for each test sample are counted at least twice—once when exposed to radiations emitted from the standard emitter and once when the standard emitter is disoperatively associated therewith, and wherein the second count is initiated and the standard emitter is either operatively or disoperatively associated with the test sample as an incident to completion of the first count.

A related object of the invention is to provide improved spectrometry methods and apparatus which will greatly facilitate and speed up the quantitative determination of counting efficiency.

It is a further object of the invention to provide methods and apparatus for permitting accurate determination of the true activity levels of test samples characterized by their versatility and adaptability to diverse conditions. In this connection, it is an object of the invention to provide methods and apparatus for automatically subjecting each of a plurality of radioactive test samples to two complete counting cycles and wherein during one of the counting cycles the sample is exposed to a standard emitter (positioned either exteriorly or interiorly of the sample vial) characterized by its ability to create a known spectrum of light energy in the scintillator as a result of interactions occurring between the emitted ionizing radiation and the scintillator molecules.

In one of its important aspects, it is an object of the invention to provide improved methods and apparatus for automatically exposing samples to radiations emanating from a standard emitter as an incident to completion of a first counting cycle for such sample and without requiring the sample to be removed from the detection chamber, thus enabling the sample to be recounted without requiring manual manipulation of either the sample or the standard emitter.

In another of its important aspects, it is an object of the invention to provide novel methods and apparatus wherein a plurality of test samples are first counted in seriatim order in an environment foreign to radiations emitted from a known standard, then simultaneously and automatically exposed to radiations emanating from internal standard emitters, and then recounted in seriatim order.

A more detailed object of the invention is the provision of novel apparatus for automatically introducing either an external or an internal standard radioactive emitter into operative association with a test sample located in a counting chamber, which apparatus is simple of construction and permits of ready installation on conventional spectrometer equipment now being utilized.

Other objects and advantages of the invention will become apparent as the following description proceeds, taken in conjunction with the accompanying drawings, in which:

FIG. 2 is a fragmentary plan view of a mechanism for locating and indexing annular trays containing a plurality of test samples, here depicting the tray just prior to alignment and registration of its discharge aperture with the detection apparatus;

FIG. 3 is an enlarged, fragmentary plan view of the locating and indexing mechanism shown in FIG. 2 with certain parts removed for purposes of clarity, here depicting in solid lines the locating mechanism in the "uncocked" position, and, in phantom lines, the relative positions of the tray and indexing mechanism at the end of one quarter of a normal indexing step;

FIG. 4 is a fragmentary detailed view taken in section substantially along the line 4—4 of FIG. 2;

FIG. 5 is a sectional view taken substantially along the line 5—5 of FIG. 3 and illustrating details of the locating mechanism;

FIG. 6 is an enlarged, fragmentary sectional view taken substantially along the line 6—6 of FIG. 2 and illustrating particularly the details of the indexing drive mechanism;

FIG. 7 is an enlarged, fragmentary sectional view, taken substantially along the line 7—7 of FIG. 2, here illustrating the details of the tray alignment drive mechanism;

FIG. 8 is a plan view of the housing defining the detection chamber and the elevator mechanism for transferring samples to and from the detection chamber, here illustrating the mechanism with a portion of the shutter cover plate broken away and with its shutter in the closed position;

FIG. 9 is an enlarged, fragmentary sectional view taken substantially along the line 9—9 of FIG. 8, depicting also a section through the supporting table and a sample tray, and here illustrating the elevator mechanism in the down or "sample loaded" position with the sample to be analyzed interposed between a pair of light transducers and with the shutter closed;

FIG. 10 is an enlarged vertical section taken substantially along the line 10—10 of FIG. 8, and illustrating particularly the details of the shutter acutating mechanism;

FIG. 11 is a fragmentary, vertical sectional view taken substantially along the line 11—11 of FIG. 8, here depicting the drive mechanism for effecting vertical movement of the elevator;

FIG. 16 is a fragmentary, vertical sectional view similar to FIGS. 9 and 12, but here depicting a modified form of the invention for shifting standards of either penetrating or non-penetrating radiation from a point exterior of the detector housing to a point operatively associated with the sample vial, yet wherein the latter is retained in place in the detection chamber;

FIG. 18 is a view similar to FIG. 10, but here depicting means for recirculating a single standard emitter of penetrating radiation to and from the supply hopper;

FIG. 19 is a side elevation, partly in section and partly in diagrammatic form, here showing an alternative construction for selectively positioning and recirculating a single standard emitter of penetrating radiation;

FIG. 24 is a schematic wiring diagram of the electrical controls for those forms of the invention wherein each sample is alternately counted with and without a standard emitter in operative association therewith;

FIG. 25 is a schematic wiring diagram similar to FIG. 24 and here depicting the electrical controls used with the form of the invention shown in FIG. 15;

FIG. 27 is a schematic wiring diagram similar to FIG. 26, here depicting the controls for positioning standards in accordance with the form of the invention shown in FIG. 16;

FIG. 29 is a schematic wiring diagram similar to FIG. 26, here depicting the electrical controls for positioning and recirculating a single external standard in accordance with the form of the invention shown in FIGS. 19 and 20;

FIG. 30 is a block diagram of a conventional electrical system which accepts, counts, and records the output of a radiation detector;

FIG. 32 is a graphic representation of typical pulse height spectra characteristic of beta emitting isotopes and illustrating particularly the principle of "balance point" operation;

Figure 1:
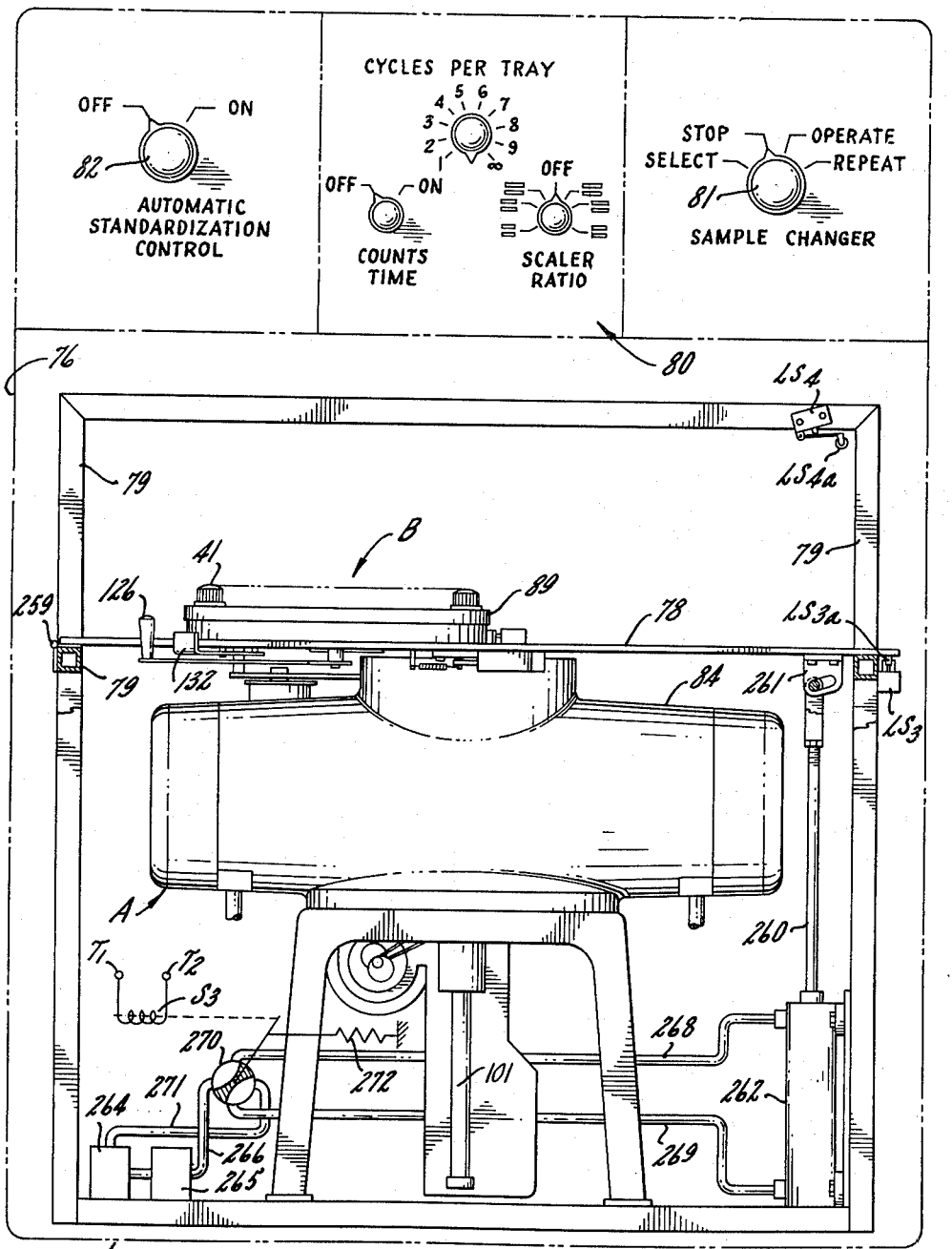
FIGURE 1 is a front elevational view of an exemplary radioactive sample handling and measuring apparatus, here illustrating the component subassemblies of the apparatus housed in a suitable cabinet or console shown in phantom, and depicting one form of the invention in partial elevation and in partial schematic form.

FIG. 33 is a graphic representation of typical pulse height spectra characteristic of beta emitting isotopes, here illustrating both a pure unquenched spectrum and a spectrum that might result because of quenching appearing in the liquid scintillation medium; and, FIG. 34 is a diagrammatic view depicting the creation of light scintallations as a result of "Compton" interactions occurring as a result of the emission of highly penetrating radiation.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

Figure 31:
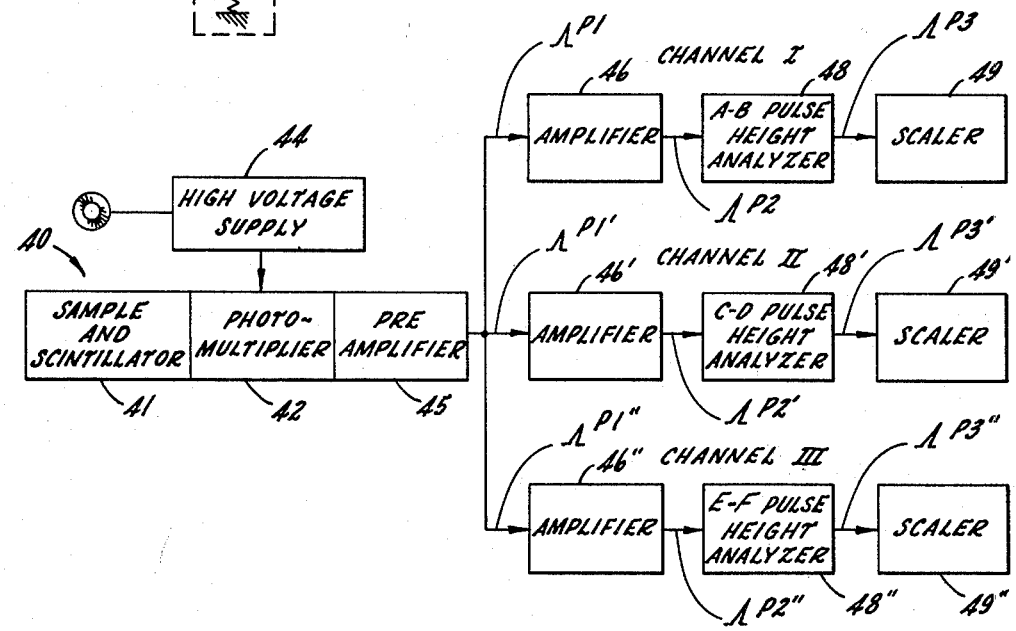
FIG. 31 is a simplified diagrammatic block-and-line representation of a conventional liquid scintillation spectrometer suitable for use in detecting and measuring radiations emanating from a test sample containing a radioactive source.

In order to facilitate an understanding of the ensuing description, it will be helpful to first consider briefly the environment in which the present invention finds particularly advantageous application. To this end, there is diagrammatically illustrated in FIG. 31 a conventional liquid scintillation spectrometer, generally indicated at 40, which, while not so limited in its application, is particularly suitable for analyzing test samples containing isotopes which produce radiation particles having relatively low penetrating power such, for example, as beta particles. In liquid scintillation spectrometers of the type illustrated, the isotope containing substance to be analyzed is dissolved, suspended, or otherwise mixed in a liquid scintillation medium comprising a solvent and one or more of numerous commercially available scintillators or fluorescent materials, the scintillation meduim being contained within a vial having light-transmissive walls. For ease in reference, the isotope containing substance, scintillation medium, and vial will hereinafter be referred to collectively as the "test sample," such test sample being shown diagrammatically at 41 in FIG. 31.

Typical solvents commercially used in liquid scintillation work are benzene, toluene, xylene and ethers such, for example, as dioxane, anisole, and methyl Cellosolve; however, the foregoing does not represent an exhaustive list of such solvents. The solvent frequently includes as a minor constituent therein, alcohols such as methanol, ethanol or glycol. Sometimes water is also present in the solvent.

*(a) General organization and operation of liquid scintillation spectrometers*

When decay events occur in the isotope present in the test sample 41, radiation particles (e.g., beta particles) are emitted which coact with the scintillator molecules to produce light flashes. The mount of light produced by any given decay event (i.e., the number of light photons) is substantially proportional to the energy of the decay event. The light flashes or scintillations are detected by a light sensitive device or light transducer such, for example, as a photomultiplier 42. The photosensitive cathode and the anode of the photomultiplier 42 are connected to a variable source of high voltage 44. Those skilled in the art will appreciate that those scintillations which produce sufficient light photons to trigger the photomultiplier will cause the latter to produce an electrical output signal, e.g., a voltage pulse, which is substantially proportional in amplitude to the energy of the corresponding decay event. Such output pulses from the photomultiplier are passed through a suitable preamplifier 45 and then simultaneously to a plurality of parallel analyzing counting channels. Thus, those decay events occurring in the test sample 41 which trigger the photomultiplier 42 will produce identical input pulses P1, P1' and P1" for the three illustrative counting channels (here Channel I, Channel II and Channel III). Of course, it will be understood that the amplitude of the pulses can be controlled in various ways; for example, by suitable adjustment of the high voltage supply 44, the latter controlling the transfer function or gain of the photomultiplier 42.

Provision is made for separately analyzing the pulses P1, P1', P1" which are respectively presented simultaneously to the three analyzing channels so as to enable discrimination of the pulses in each channel on the basis of differences in their amplitudes. To this end, and considering Channel I for example, each input pulse P1 is first amplified in a linear amplifier 46 and then fed to a conventional pulse height analyzer 48 as an amplified pulse P2. Those skilled in the art will appreciate that such pulse height analyzers are characterized by their ability to discriminate pulses on the basis of their amplitudes, passing only those which fall within a preselected amplitude band or range of pulse heights, all other pulses being blocked. Thus, the pulse height analyzer 48 forms what is commonly referred to as a "window" having lower and upper limits or discriminators A, B (FIG. 32), such discriminators being adjustable through suitable means (not shown) well known in the art. Those pulses P2 which exceed in amplitude the lower discriminator A but do not exceed the upper discriminator B, are passed through the analyzer 48 as pulses P3, which are then fed to a scaler 49 or other suitable counting and recording device.

Analyzing Channels II and III are substantially identical to Channel I described above, also including respective linear amplifiers 46', 46", pulse height analyzers 48', 48", and scalers 49', 49". However, in this instance the pulse height analyzers 48', 48" are adjusted to pass amplitude bands or ranges of pulses which are respectively different from one another and from the band of pulses passed by the analyzer 48 in Channel I. Consequently, the "window" formed by the analyzer 48' is defined by lower and upper discriminators C and D respectively (FIG. 32), while the "window" formed by the analyzer 48" is defined by the lower and upper discriminators E and F. Only those amplified pulses P2', P2" which respectively exceed in amplitude the discriminators C, E and do not respectively exceed the discriminators D, F are passed through the corresponding analyzers 48', 48" and presented to scalers 49', 49" as pulses P3', P3". Of course, while the A-B, C-D and E-F "windows" have been diagrammatically represented in FIG. 32 as being completely separate, it will be appreciated that they could be adjusted in various ways to suit different operating requirements. Merely by way of example, the discriminator B could be adjusted to a higher amplitude level than the discriminator C, in which case pulses having amplitudes in the range between B and C would be counted in both channels.

*(b) Spectral distributions and factors affecting pulse height spectra*

Beta emitting isotopes each have their own characteristic energy spectrum, such spectrum including a few decay events of near zero energy, a few decay events of maximum energy, and a majority of decay events having energies in the region between the lower and upper limits. Between the lower and upper limits, the spectrum rises to a peak and then falls. Since the light transducer or photomultiplier 42 produces pulses which are substantially proportional in amplitude to the energies of the corresponding decay events, the pulse height spectrum will, for a given gain of the photomultiplier, correspond to the energy spectrum of decay events. A characteristic pulse height spectrum for a typical beta emitter is graphically represented by the spectral curve 50 shown in FIG. 32. It will, of course, be understood that the area under the curve 50 is representative of the total number of output pulses from the photomultiplier and is, therefore, proportional to the total number of decay events occurring in the test sample in a given unit of time, say a minute.

A real problem often encountered in liquid scintillation spectrometry results from a phenomenon generally known as "quenching," a phenomenon which causes the pulse height spectrum representative of a given isotope to vary from that which would normally be observed when no quenching occurs. When the test sample 41 is prepared, a solvent for the scintillation medium is selected which is transparent and which has maximum light-transmitting characteristics. The vial which contains the sample is also carefully selected to insure that it will not impede the transmission of light photons to the photomultiplier. However, the substance containing the radioactive material to be assayed often has relatively poor light-transmitting characteristics. Merely by way of example, if the radioactive isotope is contained within a blood or urine sample, the test sample will be red or yellow in color rather than clear. Such red or yellow coloring of the test sample impedes the transmission of light from the scintillation flashes to the photomultiplier 42 so that the latter does not detect the same number of light photons as it would otherwise have detected had the test sample 41 been clear. Stated another way, the light produced in the scintillation medium by a given decay event is attenuated in its passage to the photomultiplier with a consequent attenuation of the output pulses from the photomultiplier. Moreover, since certain of the lower energy decay events produce only a few light photons, the effect of light attenuation in the test sample will, in some instances, prevent a sufficient number of light photons from reaching the photosensitive cathode so that no detectable response in the photomultiplier 42 is produced. The foregoing phenomenon is commonly referred to as "color quenching," and can be represented graphically as shown in FIG. 32 by the spectral curve 51. Thus, while the particular isotope being tested would, in the absence of quenching, produce a spectrum such as shown at 50, in the presence of such color quenching, the entire spectrum would shift downwardly (or to the left as shown at 51 in FIG. 32) because of light attenuation in the sample 41.

There is still another source of quenching error which introduces problems into liquid scintillation spectrometry techniques. This latter source of error is commonly referred to as "chemical quenching," and results from the presence of certain substances in the test sample which, irrespective of color, interfere with the conversion of radiation energy into light energy. Such substances cause a portion of the radiation energy to be dissipated as heat rather than producing light photons in the scintillation medium. The presence of chemical quenching can, in some instances involving relatively low energy decay events, prevent generation of a sufficient number of light photons to trigger the photomultiplier.

It will be apparent that chemical quenching will produce an effect similar to that produced by color quenching; i.e., the pulse height spectrum will be shifted to the left and represented by a curve 51 rather than the curve 50. And, of course, in certain instances the total effect may be cumulative—that is, the test sample may be subject to both chemical and color quenching.

When assaying test samples containing radioactive material having low activity levels, it is desirable that the spectrometer 40 (FIG. 31) be operated at, or near, optimum counting conditions so as to exclude from the count a large proportion of spurious signals, such as pulses representative of background noise, and to minimize the undesirable effects of shifts in the spectrum. Such background noise pulses may be produced by cosmic rays striking the scintillator, thus tending to produce spurious light flashes. Background noise may also result from the presence of contaminating isotopes such, for example, as $K^{40}$, present in the glass of the vial. While background noises are generally present throughout the entire range of pulse amplitudes, they predominate at the lower and higher pulse height ranges—there being a smaller proportion of background noises in the intermediate pulse height ranges. Thus, the amplitude distribution of background noises may be represented by the curve 52 shown in FIG. 32.

In order to operate the spectrometer 40 at, or near, optimum counting conditions, it is necessary to adjust the pulse height analyzer 48 (FIG. 31) so that counting efficiency in Channel I (the ratio of counts observed on the scaler 49 to the number of decay events occurring in the test sample 41) is high while the number of background counts are low—preferably the AB window should be adjusted so that the ratio $E^2/B$ (where E is counting efficiency and B is background noise) is maximized. To achieve this desirable objective, the AB window (FIG. 32) of the pulse height analyzer 48 should be wide, but not so wide that the number of background pulses included in the window are great in comparison with the number of pulses resulting from decay events in the test sample. Moreover, in order that the counting efficiency be as high as possible for a given window width, the AB window should embrace the peak portion of the pulse height spectrum 50.

A second factor important to optimum counting conditions is that of "balance point operation," an operation wherein the spectrometer 40 is adjusted so that it is relatively insensitive to slight shifts in the pulse height spectrum due to drift or changes in the system gain. Referring to FIG. 32, let it be assumed that the spectrum 50 shifts slightly to the left (e.g., to the position shown by curve 51). Such a shift might be due to color or chemical quenching as previously described or, alternatively, it might be due to undesirable drifting or lowering of the system gain or to changes in line voltage. However, in each instance the total activity level of the test sample 41 remains unchanged. Comparing the spectrum 51 with the spectrum 50, it will be observed that fewer pulses having amplitudes greater than V$x$ will be passed through the AB window to the scaler 49, but more pulses having amplitudes less than V$x$ will be passed through the window. In other words, pulses lost from the spectrum shift are represented by the shaded area 54, while pulses gained are represented by the area 55. As here illustrated, the two areas are substantially equal by virtue of the fact that the center of the selected AB window is adjusted to coincide approximately with the peak of the spectrum 50; i.e., so that a loss of pulses from a spectrum shift is "balanced" by a gain of pulses. Operation with the spectrometer so adjusted is thus termed "balance point operation," and results in making the counting efficiency for a particular isotope substantially independent of minor, unavoidable drifts in the gain of the system. The balancing effect occurs whether the spectrum shifts slightly to the left or the right, although it will be appreciated that shifts due to quenching will be downward shifts—that is, to the left. From the foregoing explanation, it will be apparent that if the counting window (i.e., the AB window) is not adjusted for balance point operation, shifts in the spectrum could result in appreciable erroneous changes in the counting efficiency and the measured count rate. Therefore, it is desirable to operate in balance point operation whenever possible.

Occasionally, however, it is either not possible or not desirable to operate in balance point operation. Such inability to operate at balance point may, merely by way of example, be due to the particular spectrum representative of the isotope being counted. Referring to FIG. 33, there is illustrated a graphic representation of a pulse height spectrum 56 for a different beta emitting isotope. As here shown the peak of the spectrum 56 is located within the AB window but is not centered with respect thereto. If quenching occurs in the test sample, the spectral curve 56 will shift to the left as represented by the curve 58. The peak of the latter curve is here centered at approximately the lower discriminator A of the AB window. It will be noted that a few pulses which exceed in amplitude V$y$ are lost because of the shift, the loss in pulses being represented by the shaded area 59. Virtually no pulses are gained in this instance since the crossover point of the two curves approaches the lower discriminator A. Consequently, the number of pulses recorded and observed in the scaler 49 (FIG. 31) will be materially reduced because of quenching and the counting efficiency will be decreased.

Even when operating at balance point conditions, it is possible that a substantial number of pulses will be lost if the shift in the spectrum due to quenching is great enough. Such a shift is represented in FIG. 32 by the curve 60 wherein it will be observed that as the crossover point between a quenched and an unquenched spectrum approaches closer to the lower discriminator A, more and more pulses are lost. This is true even though the spectrometer 40 is adjusted to count an unquenched sample at balance point.

(c) Quantitative determination of quenching and true sample activity levels

In order to determine whether or not quenching is occurring in any given sample, it is merely necessary to monitor the ratio of observed counts in scaler 49 to the observed counts in scaler 49'. Considering FIG. 32 for example, if it is assumed that a slight shift in the pulse height spectrum occurs (as illustrated by the shift from curve 50 to curve 51), the number of observed counts in scaler 49 will remain substantially unchanged since the spectrometer is adjusted for balance point operation. However, since the area under curve 51 included within the CD window is substantially less than the area under the curve 50 in that window, the number of observed counts in scaler 49' will decrease, and the ratio of counts in scaler 49 with respect to counts in scaler 49' will, therefore, provide an indication that some quenching has occurred. On the other hand, should the shift from curve 50 be a substantial shift, for example, to the position shown at 60 in FIG. 32, the observed count in scaler 49 will drop—however, in this exemplary instance there will be virtually no observed counts in the scaler 49' and the ratio of counts in the two scalers will still change significantly.

Referring next to FIG. 33, it will be noted that the shift of the spectrum from curve 56 to curve 58 will also produce a significant change in the ratio of counts observed in the AB and CD windows, even though the spectrometer is not adjusted for balance point operation. Those skilled in the art will appreciate, therefore, that a change in the ratio of observed counts in the two scalers will occur irrespective of whether the spectrum shift is slight or great, and irrespective of whether or not one of the pulse height analyzers is set for balance point operation. However, while a ratio change as described above may be used as a quantitative index of quenching, there are situations where it does not give rise to satisfactory results.

In order to make a quantitative corrective computation to determine the amount of quenching in a quenched sample, thereby enabling the technician to determine the true radioactive strength of the sample, it is therefore, desirable to expose the test sample 41 to radiations emanating from a standard emitter after the sample has been initially counted. Merely by way of example, assume that the test sample 41 (FIG. 31) is suspected to have some quenching occurring in it. Such suspicion may be based upon either the physical appearance of the sample or upon detection of a ratio change in the two scalers when comparing the observed count from the test sample 41 with the corresponding observed count from a known standard of the same isotope. Let it also be assumed that the suspected test sample 41 initially yields a count of 6,000 c.p.m. (counts per minute) and that an internal standard of the same isotope, or an isotope having essentially the same beta energy spectrum, is then added to the test sample—the internal standard having a known radioactivity strength of 30,000 d.p.m. (decay events per minute). Dependent upon the particular instrument settings, such known internal standard will have a known count rate—that is, if the instrument is set to count at 50% efficiency, the particular standard should produce, in an unquenched system, 15,000 c.p.m. in the scaler 49 (represented diagrammatically in FIG. 33 by the area in the AB window under the spectral curve 61 which is here representative of the energy spectrum of the internal standard in a pure unquenched system).

After the known internal standard is added to the test sample 41, the latter is subjected to a second counting procedure. Next, assume that during the second counting procedure the scaler 49 records 13,500 c.p.m. rather than the 6,000 c.p.m. recorded in the first counting procedure. Thus, the increase in observed counts on the scaler 49 is 7,500 c.p.m. rather than a 15,000 c.p.m. increase that would have been detected had the test sample 41 been unquenched. In this instance, the increase of 7,500 c.p.m. is represented by the area in the AB window under the curve 62, the latter being represented of the observed energy spectrum of the internal standard in a quenched system. Since the increased observed count resulting from the addition of the internal standard is only half of what would have been expected in an unquenched sample, it can readily be determined that the 6,000 c.p.m. recorded in scaler 49 during the first counting procedure represents only half of the count which would have been observed had the test sample 41 been unquenched. Therefore, the technician can record a true count, corrected for quenching, of 12,000 c.p.m. and, since the spectrometer 40 is adjusted to count at 50% efficiency, a true count rate of 12,000 c.p.m. is representative of an istotope having an activity level of 24,000 d.p.m.

The above procedure has heretofore been practiced by removing the sample 41 from the detection chamber and adding thereto known small volumes of a standard radioactive material, such material being termed the "internal standard." For example, such a procedure has been described by F. Newton Hayes in an article entitled "Liquid Scintillators: Attributes and Applications" published in the International Journal of Applied Radiation and Isotopes, 1956, vol. I, pp. 46–56. However, this type of an operation suffers from certain disadvantages and inconveniences. In the first place, the manipulative steps of pipetting known amounts of a standard solution into the test vials, or manually adding solid standards thereto, are tedious and time consuming, particularly where a large number of quenched samples are being handled. Moreover, the pipetting operation requires considerable skill by the technician and, since the standard is a radioactive solution, spillage may occur which creates a health hazard and which occasionally contaminates other test samples. In addition, the radio active strength per unit volume of some liquid standards does not remain stable due to evaporation of the solvent. In an effort to overcome this latter disadvantage, some standard solutions have been prepared wherein both the solvent and the radioactive solute are volatile, thus maintaining a generally stable radioactive strength per unit volume of the standard solution. However, where the radioactive solute is volatile, a substantial health hazard is created.

Contrasted with the "internal standardization" approach described above, those skilled in the art have also recognized that it is possible to produce an effect in a liquid scintillator similar to that produced by adding an internal standard, by exposing the scintillator to a standard external source of penetrating radiation, such, merely by way of example, as a gamma emitter. This procedure may be termed "external standardization" and has heretofore been described in an article entitled "Liquid Scintillators. I. Pulse Height Comparison of Primary Solutes," Nucleonics, December 1955, vol. 13, No. 12, pp. 38–41, by F. Newton Hayes, Donald G. Ott, Vernon N. Kerr, and Betty S. Rogers, as well as in an article entitled "Liquid Scintillators. II. Relative Pulse Height Comparisons of Secondary Solutes," Nucleonics, January 1956, vol. 14, No. 1, pp. 42–45, by F. Newton Hayes, Donald G. Ott and Vernon N. Kerr. As in the case of internal standards, external standardization has heretofore involved a tedious and time consuming operation wherein the standard is manually positioned each time that quenching is suspected and manually removed when it is desired to count without a standard.

Generally stated, external standardization techniques are based upon a phenomenon known as "Compton Scatter," a phenomenon wherein the interactions that occur between penetrating radiation and electrons that comprise part of the test sample, produce electrons in the liquid scintillator having an energy spectrum similar in shape to that produced by a beta emitter. Referring to FIG. 34, it will be observed that a standard source 64 of penetrating radiation has been diagrammatically located exterior of and in proximity to a test sample 41, which here takes the form of a vial containing a liquid scintillator. As is characteristic of gamma emitters, or emitters of similar penetrating radiation, the source 64 will undergo a plurality of decay events in a given period of time, such decay events resulting in the emission of gamma rays in diverse directions represented by broken lines 65a–65f, 65n. As here shown, the gamma radiation 65a has interacted at point 66 with matter (which may, for example, comprise molecules of the shield material), thus causing excitation of electrons. Under some circumstances, the energy of the gamma radiation may be totally absorbed, although more often the energy of the impinging gamma radiation is only partially absorbed. In the latter event, a photon will veer off randomly, in accordance with the principle of conservation of momentum, at a reduced energy level( as represented at 68) until a second Compton interaction (not shown) occurs.

The gamma radiation 65b shown diagrammatically in FIG. 34 has been depicted as passing entirely through the test sample 41 and then interacting with matter at point 69. Again assuming that the energy of the impinging gamma radiation 65b is only partially absorbed, it will be appreciated that a lower energy photon 70 will veer off in a random direction and may or may not again pass towards or through the test sample 41. Since the photon 70 is at a reduced energy level, the chances of producing a second Compton interaction are increased, and such an interaction is here shown occurring in the liquid scintillator at point 71. When the photon 70 interacts with matter at point 71, the energy of the photon will be either totally or partially absorbed, thus producing electrons and creating a light scintillation in the sample 41. A third gamma radiation 65c is here shown as interacting directly with matter at point 72 within the sample 41 so as to produce a light flash therein. Again, the radiation may be either totally or partially absorbed and, in the latter event, a photon 74 of reduced energy will veer off in a random direction.

The net result of the foregoing is that Compton interactions occurring in the sample 41 will produce an observable energy spectrum which is similar to that produced by a beta emitter and which can, in some instances, also be represented by the curve 61 shown in FIG. 33. Consequently, if the isotope disposed in the test sample 41 happens to have an energy spectrum that is essentially the same as the energy spectrum 61 (FIG. 33), then it is possible to again determine the true activity level of the isotope by the arithmetical computations set forth above. Of course, when the technician is dealing with internal standards, it is often relatively simple to select a standard of the same isotope as that located in the test sample or to select a standard that has an energy spectrum essentially similar to that of the isotope.

On the other hand however, when dealing with either external standards or dissimilar isotopes, the most conventional practice involves the preparation of a set of calibration curves (not shown) which are determined in advance for each different sample volume that may be encountered. This is done by preparing a series of samples of known activity for each different isotope that may be of interest. A different amount of quench material is then added to each sample in each series. The differently quenched samples in each series are then counted (1) in an environment free of any external standard so as to determine counting efficiency for each varying degree of quenching and (2) in an environment exposed to an external standard so as to determine the count efficiency for the external standard for each varying degree of quenching. Based upon the foregoing data, it is possible, in a manner well known to those skilled in the art, to prepare a set of calibration curves for each isotope of interest and for each sample volume that may be encountered. Thus, it is merely necessary to compare the two observed counts for each unknown test sample 41 (one count without a standard emitter and one count with a standard emitter) in order to determine counting efficiency, and thus, true sample activity levels.

When preparing calibration curves and measuring the true activity levels of test samples containing, for example, two radioactive isotopes of unknown strength in the manner set forth above, the technician can record the counts observed in the sample and produced by the standard in any of the three scalers 49, 49', 49''. However, normally the standard source is selected so that its energy spectrum 61' is greater than that of the isotopes being tested. Consequently, it is possible to adjust the EF window so that the latter passes only pulses generated by the standard source. In other words, the lower discriminator E for the EF window is set to exceed the maximum pulses that will be created by the isotope being tested. Consequently, any variation in the count recorded in the scaler 49'' represents the net change in counts resulting from decay events in the standard alone. If, on the other hand, the technician wished to use only a two channel system, it would be necessary to perform an additional arithmetical computation in order to subtract the counts in the AB, CD windows (counts which are respectively created by the two isotopes) from the total number of counts in those windows, it being understood that the total number of counts in each window is here representative of pulses generated by decay events in both the isotopes being measured and the standard.

GENERAL ORGANIZATION OF AN EXEMPLARY SAMPLE PROCESSING APPARATUS

Referring now to FIG. 1, there is illustrated an exemplary automatic sample processing apparatus, generally indicated at 75, which is intended to transfer a plurality of samples one at a time in seriatim order to and from a detection station. To this end, the exemplary apparatus 75 includes an elevator and detector mechanism, generally indicated at A, and a rotary tray alignment and indexing mechanism generally indicated at B.

As best illustrated in FIG. 1, the mechanisms A and B of the exemplary apparatus 75 are mounted in a console or cabinet 76 which is preferably refrigerated for the purpose of lowering the temperature to an equilibrium level so as to reduce thermal noise which otherwise tends to increase the level of spurious background signals. As here shown, the elevator and detector mechanism A is disposed in the lower end of the cabinet 76 with the rotary sample indexing mechanism B being physically mounted on a table 78 which overlies the upper end of the elevator and detector mechanism and is supported on the frame 79 of the apparatus 75. The cabinet or console 75 is dimensioned such that it defines a compartment 80 at its upper end which is suitable for receiving and mounting certain of the electrical components of the apparatus 75 such, for example, as printed circuit boards and the like (not shown). To provide for control of a sample changing and counting cycle, a plurality of manually operable switches are mounted on the front of the cabinet 76. The functions of two of the switches 81, 82, shown diagrammatically in FIG. 1, will be described more fully in conjunction with the control circuitry (FIGS. 24, 25) for the exemplary apparatus. For the moment it should suffice to note that the switch 81 is a Mode Selector Switch, while the switch 82 is an Automatic Standardization Control Switch.

To facilitate an understanding of the present invention, the general organization and operation of the elevator and detector mechanism A will be briefly described hereinbelow. Those interested in a more complete operational and structural description of the mechanism A are referred to the copending application of Robert E. Olson, Serial No. 273,110, filed April 15, 1963, and assigned to the assignee of the present invention.

Referring to FIGS. 1 and 9 conjointly, it will be noted that the elevator and detector mechanism A includes a base assembly 84 which houses a pair of light transducers, for example, photomultipliers 42, 42' disposed on opposite sides of a vertical elevator shaft 85. Mounted within the elevator shaft 85 is an elevator 86 having a platform 88 at its upper end for reception of one of the radioactive test samples 41 from the rotary indexing mechanism B and transporting the sample downwardly into the elevator shaft where it is aligned between the photomultipliers 42 and 42'. Each sample 41 may, as heretofore indicated, simply comprise a vial or other suitable container within which is placed a liquid scintillator and the radioactive isotope or isotopes to be measured. Thus, as the isotope or isotopes undergo decay events, light scintillations are produced in the liquid scintillator, and such scintillations are then detected by the photomultipliers which produce electrical output signals in the form of voltage pulses corresponding to each light scintillation detected. At the completion of the counting cycle, the elevator 86 is returned upwardly to again position the sample 41 in the tray 89 from which it was removed. A shutter mechanism 90 is mounted on the upper end of the base assembly 84 for the purpose of preventing erroneous output signals from the photomultipliers 42, 42' resulting from environmental light. At the same time, the base assembly 84 is formed of suitable shielding material such, for example, as lead, which serves to minimize the amount of environmental ionizing radiation causing light flashes in either the scintillation medium or the photomultipliers.

In order to insure that the shutter mechanism 90 is opened and closed in timed relationship with vertical movement of the elevator 86, the two devices are interconnected and actuated by a common reversible drive motor M1. Thus, referring to FIG. 10, it will be observed that the shutter mechanism 90 comprises a plurality of movable shutter blades 91 which are interleaved with a plurality of fixed shutter blades 92, the latter having apertures 94 therein aligned with the elevator shaft 85. The arrangement is such that when the movable blades 91 are pivoted about a point 95 (FIG. 8), they swing between limit positions to selectively open and close the upper end of the elevator shaft 85.

To effect such pivotal blade movement, the movable shutter blades 91 are rigidly secured to a stub shaft 96 in a manner more fully described in the aforesaid Olson application Serial No. 273,110. Suffice it to say that the stub shaft 86 is rigidly secured to the upper end of a generally flat, depending shutter actuating shaft 98 having a twisted portion 99 intermediate its ends. The lower end of the actuating shaft is received within a tubular drive shaft 100, the latter being coupled adjacent its lower end to an elevator actuating shaft 101 by means of a bracket 102. A pair of dowel pins 104, 105 or similar cam means extend transversely through the tubular drive shaft 100 in closely spaced surrounding relation to the shutter actuating shaft 98.

The arrangement is such that as the drive shaft 100 starts to move vertically upward, force is transmitted through the bracket 102 and the elevator actuating shaft 101, thus starting the elevator 86 upwardly to unload the sample 41. Just prior to the time that the sample 41 reaches the shutter mechanism 90, the dowel pins 104, 105 traverse the twisted portion 99 of the shutter actuating shaft 98, rotating the latter about its own vertical axis and pivoting the movable blades 91 to the dotted line open position shown in FIG. 8. Further upward movement of the drive shaft 100 then causes the sample 41 to be ejected from the elevator shaft 85 as shown by the dotted line elevator and sample position in FIG. 9. During a sample loading cycle, the pins 104, 105 serve to cam the shutter actuating shaft 98 in the opposite direction immediately after the new sample passes through the aligned apertures 94 in the shutter mechanism 90, thus swinging the movable blades 91 to the solid line close position shown in FIGS. 8 and 9.

To effect vertical movement of the drive shaft 100 and the elevator 86 for the purpose of introducing samples 41 into and ejecting such samples out of the elevator shaft 85, the drive shaft 100 is drivingly coupled to a conventional reversible motor M1 (FIG. 11). As here illustrated, this is accomplished by affixing one end of an elevator cable 106 to the drive shaft 100 at a point 108 intermediate the ends of the latter, the opposite end of the cable 106 being trained about an idler pulley 109 and a pulley 110 which is eccentrically mounted on the shaft 111 of the motor M1. A second elevator cable 112 is affixed to the lower end of the drive shaft 100 as indicated at 114, the cable 112 also being trained about the idler pulley 109 and about a second pulley 115 which is mounted eccentrically on the shaft of the motor M1. The arrangement is such that when the motor M1 is energized to run in a clockwise direction (as viewed in FIGS. 9 and 11) the cable 112 will "pay off" its pulley 115 while the cable 106 will simultaneously "pay on" its pulley 110, thus lowering the elevator 86, and any sample contained thereon, into the elevator shaft 85. Of course, it will be appreciated that counterclockwise movement of the motor M1 (as viewed in FIGS. 9 and 11) will serve to "pay out" the cable 106 and simultaneously "pay in" the cable 112, thus raising the elevator 86.

The energizing circuit for the motor M1 includes a lower limit switch LS1 (FIGS. 10 and 24) which is mounted on the frame of the elevator and detector mechanism A in a position to have its actuator $LS1_a$ depressed by a laterally projecting flange 116 mounted on the lower end of the elevator when the latter is in a down position with the sample 41 carried thereon aligned between the photomultipliers 42 and 42′. Depression of the actuator $LS1_a$ serves to deenergize the motor M1 and the apparatus is then ready for a counting cycle. A second limit switch LS2, included in a second energizing circuit for the motor M1, is mounted on the frame of the elevator and detector mechanism A in position to have its actuator $LS2_a$ depressed by the flange 116 when the elevator arrives at its uppermost limit position with the sample 41 carried thereon having been returned to the tray 89 from which it was removed. Thus, the limit switch LS2 serves to deenergize the motor M1 when the elevator reaches its uppermost limit position. The energizing circuits for initiating clockwise and counterclockwise rotaton of the motor M1 will be described more fully in conjunction with the control circuit shown in FIG. 24.

While those skilled in the art will appreciate that any of numerous conventional means can be utlized to transfer samples 41 one at a time in seriatim order a point of registration with the elevator platform 88 (FIG. 4), it may be helpful to an overall understanding of the invention to briefly describe the general organization and operation of the exemplary rotary sample indexing mechanism B shown in FIG. 1. Those interested in a more complete operational and structural description of the mechanism B are referred to the copending application of Lyle E. Packard, Alfred A. Munn, Roy E. Smith and Edward F. Polic, Serial No. 273,189, filed April 15, 1963, and assigned to the assignee of the present invention.

Referring now to FIGS. 2 and 4 conjointly, it will be observed that the tray 89 utilized to transfer samples 41 to the elevator mechanism A is annular in configuration and defines a plurality of open ended compartments 118 each of which is capable of receiving a single test sample 41. Of course, each tray 89 may contain any number of samples from one sample to the full tray capacity which is determined by the number of compartments 118 in the tray (there being twenty-four such compartments in the exemplary tray 89). To prevent the samples from inadvertently dropping out of the tray, the lower ends of all of the compartments 118 are normally closed by means of an annular gate 119 which is mounted in the tray with freedom for relative sliding movement with respect thereto, but which is normally latched to the tray by means of a pivotal latch 120 (FIGS. 2 and 3).

The particular means employed for locating the tray 89 forms no part of the present invention. Thus, those skilled in the art will appreciate that the trays 89 could be stored at a point remote from the table 78 and automatically transferred to the table one at a time in the manner described in the aforesaid Packard et al. application Serial No. 273,189. However, to simplify the ensuing discussion, the tray alignment and indexing mechanism B will here be described in connection with a single tray 89 which is manually positioned on, and removed from, the table 78 by the technican.

For the purpose of properly orienting the tray 89 on the table 78, the latter has mounted thereon a pair of idler rolls 121, 122 which are fixed to the table for rotation about their own stationary vertical axes. A retractable slide 124, having a generally arcuate leading edge 125, is also mounted on the table in such a manner that when the slide shifted outwardly, its arcuate leading edge 125 defines with the two idler rolls 121, 122 a three-point centering system which positively locates the tray 89 for indexing rotation about a fixed axis. To facilitate such indexing movement, the leading edge of the slide can, if desired, include one or more rollers (not shown) which are adapted to engage the inner peripheral wall of the tray.

In the illustrative device (FIGS. 2 and 4), the slide 124 is coupled to a manual actuating lever 126 which is pivoted at 128 to the table 78. A spring 129 having its opposite ends secured to respective ones of the table 78 and the lever 126, serves to normally urge the lever in a clockwise direction about its pivot 128 (as viewed in FIG. 2), thus biasing the slide 124 into operative engagement with the tray and centering the latter. For the purpose of holding the slide 124 in a retracted position, the operating lever 126 is provided with an upstanding lug 130 which is positioned for selective reception in a notch 131 formed in one arm of a generally L-shaped release lever 132. As here shown, the release lever 132 is pivoted to the table at 134 and normally biased in a counterclockwise direction (as viewed in FIG. 2) by a spring 135, the latter having its opposite ends bottomed on the table 78 and on the lever 132.

Thus, when the manual actuating lever 126 is in the position 126' as shown in FIG. 2, it is held in that position with the slide 124 retracted by means of coaction between the lug 130 and the notch 131. In this condition, there is ample room for the technician to selectively raise and lower trays relative to the three-point centering system 121, 122, 125. When a new tray 89 is in position on the table, the technician need only pivot the release lever 132 in a clockwise direction about its pivot 134 (as viewed in FIG. 2), thus releasing the lug 130 from the notch 131, and permitting the forces exerted by the spring 129 to drive the slide 124 forward into engagement with the tray 89. When the technician is prepared to remove the tray 89, it is merely necessary to pivot the lever 126 in a counterclockwise direction until the lug 130 is again operatively engaged with the notch 131.

Once the tray 89 is properly located on the table 78, the technician need only turn the Mode Selector Switch 81 (FIGS. 1 and 24) to the On or "operate" state and the tray 89 will thereafter be aligned and indexed in the same manner as that described in the aforesaid Packard et al. application Serial No. 273,189. Thus, as will be described in conjunction with the control circuit shown in FIG. 24, when the switch 81 is turned to the "operate" state, an energizing circuit is completed for an alignment motor M2 which is operatively connected to a friction drive roller 136 through a gear train, generally indicated at 138 (FIGS. 2 and 7). The friction drive roller 136 is supported for rotation by an upstanding tubular post 139 (FIG. 7) carried on a lever arm 140, the latter being journaled for swinging movement about a fixed shaft 141 integrally secured to the table 78. Energization of the alignment motor M2 causes the friction drive roller 136 and the lever 140 to pivot (counterclockwise as viewed in FIG. 2) until the now driven roller 136 engages the inner peripheral edge of the tray 89. The tray 89 is, therefore, driven rapidly in a clockwise direction (as viewed in FIG. 2) towards a point where a discharge aperture 142 formed in the gate 119 is aligned with the elevator shaft 85 (FIG. 4). During the period when the gate 119 and tray 89 are latched together by latch 120, the discharge aperture 142 is centered with respect to a radial dividing wall on the tray between two adjacent compartments 118, thus inhibiting discharge of samples.

The exemplary apparatus 75 also provides for affirmatively latching the gate 119 to the table 78 when the discharge aperture 142 in the former is properly aligned with a discharge aperture 144 (FIG. 4) in the table and with the elevator shaft 85. To this end, a pair of levers 145, 146 (FIG. 3) are pivotally mounted on the slide 124 at 148, 149 respectively. As best shown in FIG. 2, it will be observed that during the alignment procedure, the lever 146 serves to lock an upstanding lug 150 integral with a locating pin 151 (FIG. 5) in place, the lug 150 being received within a notch 152 formed in the lever 146. Referring to FIGS. 2, 4 and 5, it will be noted that the locating pin 151 is slidably mounted in the slide 124 for linear reciprocation into and out of gear teeth 154 formed in the inner peripheral wall of the tray. However, as long as the lug 150 is confined within the notch 152 in lever 146, the locating pin 151 is effectively precluded from engaging the gear teeth 154 in the tray 89.

As the tray 89 approaches its aligned position, the latch 120 on the tray approaches a pawl 155 which is pivotally mounted at 156 on lever 145. Engagement of the latch 120 and the projecting end of the pawl 155 cause the lever 145 to pivot (clockwise as viewed in FIG. 3) about its pivot 148. This serves, through a pin and slot connection 158, to also pivot the lever 146 clockwise about its pivot point 149, thus releasing the lug 150 from the notch 152 in lever 146. When this occurs, the locating pin 151 is driven forwardly into engagement with the gear teeth 154 on the tray 89, thus effectively stopping rotation of the latter. To accomplish this, the lug 150 is positioned between the arms of a bifurcated lever 159, the latter being pivoted to the table 78 at 160 and being biased in a counterclockwise direction about the pivot 160 by means of a spring 161. Thus, when the pin 150 is released from the notch 152 in the lever 146, the lever 159 pivots counterclockwise (as viewed in FIG. 3) to drive the locating pin 151 into position between adjacent gear teeth 154 in the tray, thus latching the latter.

As the lever 159 pivots counterclockwise, it releases the actuator $MS1_a$ of a control microswitch MS1, thus causing several simultaneous operations to occur. First, the energizing circuit for the alignment motor M1 is broken, thus deenergizing the latter. Secondly, an energizing circuit for a solenoid S1 (FIG. 3) is broken, thus permitting a latching lever 162 to swing counterclockwise (as viewed in FIG. 3) about its pivoted connection 164 to the table 78 because of the force exerted thereupon by a biasing spring 165. As the lever 162 swings, a notch 166 formed therein registers with a locking pin 168 formed on the lower surface of the gate 119, thus effectively latching the gate to the table. At the same time, the lever 162 coacts with the latch 120 on the tray to disengage the tray 89 and its gate 119, thus freeing the tray for rotational indexing movement relative to the gate. Finally, the microswitch MS1 serves to complete an energizing circuit for an indexing motor M3.

The foregoing control circuits have been represented diagrammatically in FIG. 24 in block form as shown at 169. Those interested in ascertaining the details of the electrical systems represented by the block 169 are referred to the aforesaid Packard et al. application, Serial No. 273,189.

Referring now to FIGS. 2 and 6, it will be noted that the indexing motor M3 is coupled to a Geneva drive pin 170 by means of an endless belt or chain 171. The latter is trained about a large drive sprocket 172 keyed to the drive shaft 174 of the motor M3 and a smaller drive sprocket 175 journaled for rotation about a shaft 176 which is rigidly secured to the upper end of the housing 84. In the exemplary apparatus, the drive sprocket 175 is rigidly secured to a cam 178, the latter serving to support the Geneva pin 170 and also serving to cam the lever 159 (FIGS. 2 and 3) rearwardly once during each revolution of the cam. Thus, as the lever 159 moves rearwardly under the action of the cam 178, the locating pin 151 is withdrawn from its position between adjacent gear teeth 154, thereby freeing the tray 89 for indexing movement. At the same time, the Geneva pin 170 engages the rear teeth 154 in the tray to index the latter.

The drive sprockets 172, 175 are preferably dimensioned such that the sprocket 175 makes two complete revolutions for each revolution of the output shaft 174 of the indexing motor. It will be appreciated, therefore, that by forming forty-eight gear teeth 154 in a twenty-four compartment tray 89, and by properly positioning the Geneva pin 170, it is insured that for each full revolution of the motor shaft 174, the Geneva pin 170 will move twice through a circular orbit. During each orbit the Geneva pin enters the space between adjacent gear teeth 154 so as to index the tray 89 through an angular increment equal to the pitch P between adjacent gear teeth—i.e., through an angular increment equal to one-half the distance between the radial center lines of adjacent compartments 118. Consequently, the tray will be indexed from compartment to compartment for each full revolution of the motor shaft 174.

In order to deenergize the indexing motor M3 whenever the next successive compartment 118 in the tray 89 is aligned with the elevator shaft 85, a microswitch MS2 (FIGS. 2 and 24) is positioned so that once during each revolution of the motor shaft 174, a cam 179 formed on the latter engages and depresses the actuator $MS2_a$ of the microswitch, thus breaking the energizing circuit for the motor.

Of course, since the tray 89 initially starts out with the first and last sample compartments centered relative to the discharge aperture 142 in the gate 119, provision must also be made for deenergizing the motor M3 once during every twenty-four revolutions thereof (i.e., after the twenty-fourth sample 41 is returned to the tray) with the microswitch actuator $MS2_a$ and the cam 179 180 degrees out of phase. To this end, the motor shaft 174 is coupled through a suitable gear train 180 to an output gear 181, the latter being keyed to the shaft 182 of a rotary wafer switch 184 which here serves as a sample number memory. The gear train 180 is here selected such that the gear 181 makes one revolution for every twenty-four revolutions of the motor shaft 174. Therefore, it is merely necessary to position a microswitch MS3 (FIGS. 2 and 24) so that once during each revolution of the gear 181, the actuator $MS3_a$ of the microswitch is engaged and depressed by a cam 185 secured to the gear 181. Of course, the microswitch MS3 and the cam 185 are so positioned that they will coact only after an indexing step equal to the pitch P of the gear teeth 154 in the tray and only after the twenty-fourth sample is returned to the tray. At this time, the motor M3 is deenergized and the counting cycle for the tray is completed.

The foregoing control circuits for indexing the tray 89 have been represented diagrammatically in FIG. 24 in block form as shown at 186. Those interested in ascertaining the details of the electrical systems represented by the block 186 are referred to the aforesaid Packard et al. application, Serial No. 273,189.

PROGRAMMING LOGIC

Since methods and apparatus embodying the features of the present invention will normally be used with an associated programming control circuit, a typical programming system, generally indicated at 188 (FIGS. 24 and 30), will be briefly described hereinbelow. To this end and referring for the moment to FIG. 30, it will be observed that after a sample 41 has been properly positioned between the detector photomultipliers 42, 42', a signal is received on a terminal 189 (as explained more fully below) and passed over a line 190 to a program control 191. This signal indicates that a sample is "ready" for measurement. In response to such signal, the program control 191 passes a signal over lines 192 and 194 to open a gate 195 and start operation of a timer 196. During the predetermined interval measured off by the timer 196, voltage pulses produced by the photomultipliers 42, 42' are passed through an amplifier 198, and the open gate 195, to a scaler 199. At the end of the timed period, the timer supplies a signal over lines 200 and 201 to respectively close the gate 195 and indicate to the program control 191 that counting has been completed. In response to the signal received over line 201, the program control 191 first supplies an actuating signal over a line 202 to a printer 204. The latter is coupled to the scaler 199 by a channel 205 and thus prints out on a paper tape or the like the reading of the scaler 199. Following such "read out" by the printer 204, the program control 191 supplies signals over lines 206 and 208 to reset the scaler 199 and timer 196. At this time, the program control 191 also supplies a signal to a terminal 209 to signify that the sample in the detector should be changed.

Because the system shown diagrammatically in FIG. 30 may take any of a variety of forms known to those skilled in the art, it need not be illustrated or described in greater detail. It will be understood, however, that the "count" printed out by the printer 204 will include responses to background radiation which produces scintillation flashes in the liquid scintillator and which is received from extraneous sources, such background responses being in addition to the responses to radiation from the sample being measured. However, this "background count" can be first measured with no sample, or a sample of known radioactive strength in the detector. The background count can then be subtracted from each sample reading to arrive at an indication of the samples' radiation strength.

Besides counting the number of responses by the photomultipliers in a predetermined time interval (preset time operation), the time period required for the generation of a predetermined number of responses (preset count operation) may be measured and recorded, as is well known.

AUTOMATIC STANDARDIZATION WITH INTERNAL AND EXTERNAL STANDARDS ACCORDING TO THE PRESENT INVENTION

Thus far, the environment of the invention has been described in connection with the handling of a plurality of test samples and wherein (1) each sample 41 is delivered to a counting chamber, (2) the light scintillations occurring therein are counted and recorded, (3) the sample is then ejected and indexed, and (4) the next successive sample is delivered to the counting chamber. The present invention is concerned, however, with automatic standardization of such samples, either by the use of internal or external standards or emitters, and wherein each sample is counted at least twice—once when exposed to radiations emanating from the standard emitter and once without being exposed to standard radiations.

In accordance with the present invention, provision is made for measuring the true activity levels of $n$ samples 41 by counting each of the $n$ samples at least twice —there being $n$ first counts representative of only decay events occurring in the isotopes present in the $n$ samples being analyzed, and $n$ second counts for the $n$ samples representative of a preselected band of scintillations of which at least a substantial number of the scintillations are created by radiations emanating from a standard emitter—and wherein one of the $n$ first or second counts is initiated automatically as an incident to completion of one of the $n$ second or first counts, yet wherein no manual manipulation of any of the test samples or a standard emitter is required. To accomplish this, and, as best illustrated in FIG. 24, the signal presented on the "change sample" terminal 209 of the counting logic 188 (FIGS. 24 and 30) is selectively passed either directly to an Elevator Motor Control Logic 210 (shown in block form in FIG. 24 and fully described in the aforesaid Packard et al. application Serial No. 273,189) to automatically change samples, or directly to a Position Standard Control 211 which functions to automatically expose the sample 41 to a standard emitter during a second count cycle.

For this purpose, and as best illustrated in FIG. 24, the "Automatic Standardization Control Switch" 82 (FIG. 1) is utilized to permit the technician to selectively apply every signal appearing on the "change sample" terminal 209 either to the OFF terminal 212 controlled by the switch 82 (when standardization is not required), or, alternatively, to the ON terminal 214 controlled by the switch (when standardization is required). In the event that standardization is not required (i.e., the switch 82 is in the OFF position as shown in FIG. 24), the signal presented on the terminal 209 will be passed directly to the "unload" terminal 215 of the Elevator Motor Control 210. The Elevator Motor Control logic 210 (in a manner more fully described in the aforesaid Packard et al. application, Serial No. 273,189) then passes a control signal from its output "unload" terminal 216 through the "run" contacts of the limit switch LS2 to the "unload" terminal of the elevator motor M1, energizing the latter and starting an ejection or "unload" cycle for the elevator 86.

When the elevator 86 reaches its uppermost position, the flange 116 thereon (FIG. 10) engages the actuator LS2$_a$ of the limit switch LS2, opening the "run" contacts thereof and deenergizing the motor M1. The signal appearing on the unload terminal 216 is then passed through the "stop" contacts of the limit switch LS2 to the "index" terminal 218 of the "Tray Index Control" logic 186, thus energizing the index motor M3 through the output "index" terminal 219 of the logic 186. The tray 89 is now indexing towards the next sample compartment 118, and when that compartment is properly aligned with the elevator 86, the actuator MS2$_a$ of the microswitch MS2 is depressed by the cam 179, thus applying a "stop index" control signal to an input terminal 220 of the Tray Index Control 186. The logic 186 then passes a control signal from its output "load" terminal 221 to the "load" terminal 222 of the elevator control logic 210. The latter logic system then functions to energize the elevator motor M1 through the output "load" terminal 224 of the logic 210 and the now closed "run" contacts of the limit switch LS1. The elevator 86 now starts its downward or "load" cycle.

When the new sample 41 is properly positioned between the photomultipliers 42, 42' (FIG. 9), the flange 116 on the elevator mechanism engages the actuator LS1$_a$ of the limit switch LS1, opening the "run" contacts thereof and deenergizing the motor M1. At the same time, the "stop" contacts of the limit switch LS1 close, thus permitting a capacitor C1, which has theretofore been charged through the "run" contacts of the switch LS1 by a voltage source E1, to discharge through the "stop" contacts and an asymmetrically conductive device, here shown as a diode 225, thus applying an input signal to the terminal 189 of the counting logic 188, which signal is effective to initiate a count cycle for the new sample 41.

The foregoing sequence of operations is repetitive until such time as the last sample 41 (here the twenty-fourth sample) has been returned to the tray 89. When this occurs, the cam 185 on gear 181 engages the actuator MS3$_a$ of the microswitch MS3, thus closing the normally open contacts MS3–1 and MS3–2 and opening the normally closed contacts MS3–3 controlled thereby. Closure of the contacts MS3–1 applies a control signal on the terminal 220 of the index logic 186 which is effective to terminate further indexing movement. At the same time, closure of the contacts MS3–2 permits a capacitor C2 (which had theretofore been charged by a voltage source E2 through contacts MS3–3) to discharge, thus applying a control signal on the "stop" terminal 226 of the "Change Tray Control" logic 169. The counting cycle is now complete.

To initiate a count cycle for a new tray 89, it is merely necessary to properly position the tray on the table 78 and then turn the Mode Selector Switch 81 (FIGS. 1 and 24) to the "operate" terminal, thus completing an energizing circuit for the Alignment Motor M2 from the "align tray" terminal 228 of the "Change Tray" logic 169. The tray 89 is then rapidly rotated until the latch 120 thereon engages the pawl 155, thus "uncocking" the tray locating pin 151 and releasing the actuator MS1$_a$ of the microswitch MS1. This applies a control signal to the "stop" terminal 229 of the "Change Tray" logic 169. Thereafter, an "index" signal is passed to the index terminal 218 of the "Tray Index" logic 186 from an output terminal 230 of the "Change Tray" logic 169. The new tray 89 now indexes and the first sample contained therein is loaded in the manner heretofore described.

Let it now be assumed that the technician desires to count the samples 41 contained in the new tray with automatic standardization thereof in accordance with the present invention. In this event, the selector switch 82 (FIGS. 1 and 24) is turned to the ON position so that when the count for the first sample has been recorded, the signal presented on the "change sample" terminal 209 of the counting logic 188 is now passed to the Automatic Standardization ON terminal 214.

In keeping with the invention, provision is made for passing alternate signals presented at the ON terminal 214 first to the "Sample Loaded" terminal 189 of the counting logic 188 so as to initiate a second counting cycle for the sample in the detection chamber and, second, to the "unload" terminal 215 of the elevator control logic 210 so as to change samples after the sample has been counted twice. To this end, the first signal presented on the ON terminal 214 is applied to the junction of a bistable flip flop 231 to cause the latter to switch from its "reset" to its "set" condition.

Since flip flops of the bistable and monostable variety are well known to those skilled in the art, they will not be described herein in detail. Rather, the flip flops have been illustrated symbolically as having a "set" section S and a "reset" section R with a junction therebetween. It will be understood that when a signal is presented at the junction of a bistable flip flop, the latter will shift from one state to the other. Similarly, when an input signal or pulse is applied to the S section of a monostable flip flop, the latter will be momentarily "set," thus producing a predetermined output signal from the S section. After a time delay dependent upon the characteristics of the monostable flip flop, the latter will automatically return to its "reset" state.

Keeping the foregoing characteristics of conventional flip flops in mind, it will be appreciated that the first signal presented on the terminal 214 will drive the flip flop 231 to its "set" state, thus producing an output signal which is passed directly to the "Position Standard Control" logic 211 so as to automatically expose the sample 41 in the detection chamber to a standard emitter (in a manner to be described) without manipulation of either the sample or the standard. At the same time, the "set" section S of the flip flop 231 passes a control signal through a time delay device 232 directly to the "sample loaded" terminal 189 of the counting logic 188, thus initiating a second count cycle for the sample. In the exemplary forms of the invention, the time delay device 232 serves only to delay initiation of the second count until such time that the sample 41 is exposed to the standard emitter.

After the sample 41 has been counted a second time and the count recorded, the counting logic 188 will present another output signal at the "change sample" terminal 209. This signal will now be effective to switch the flip flop 231 to its "reset" state, thus passing a control signal from the "reset" section R to the "unload" terminal 215 of the Elevator Motor Control logic 210. The sample 41 is now unloaded in the manner previously described.

It will be appreciated that the system described will cycle on a repetitive basis so that each of the samples in the tray 89 is counted twice without having to remove it from the detection chamber—the first count representing the observed decay events in only the isotope being analyzed and the second count representing observed counts created at least in part by the standard emitter. Of course, those skilled in the art will appreciate that, in some instances, each sample could first be counted when exposed to the standard emitter and then recounted without being so exposed. In this latter event, the flip flop 231 would be "set" initially so that the first signal on the "change sample" terminal 269 would be effective to "reset" the flip flop.

Figure 12:
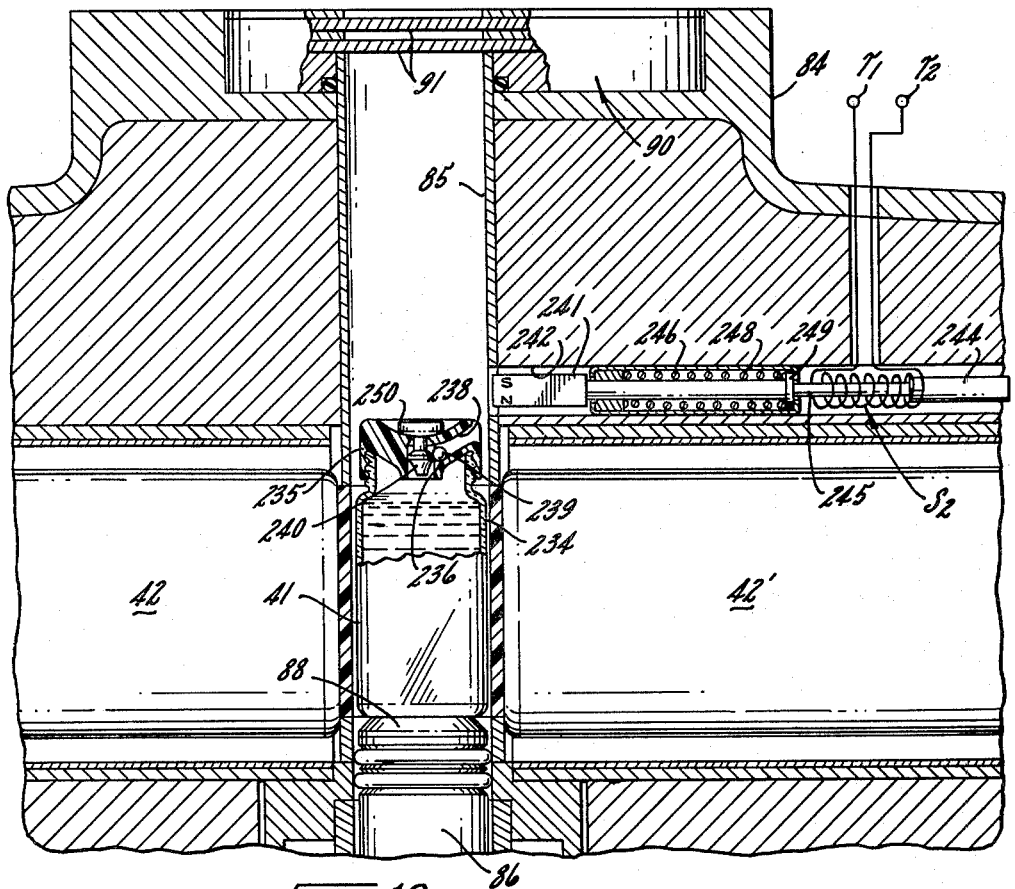
FIG. 12 is an enlarged, fragmentary vertical section similar to FIG. 9 and depicting one form of the invention for automatically introducing an internal standard emitter into a sample vial, the standard emitter here being shown in disoperative association with the vial contents.
Figure 13:
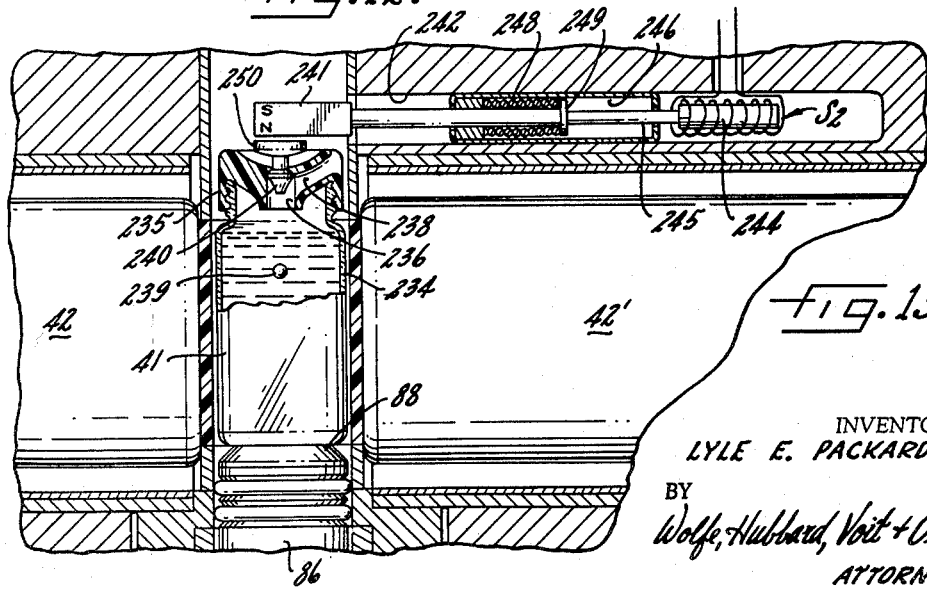
FIG. 13 is a view similar to FIG. 12, but here showing the internal standard as the latter is shifted into operative association with the contents of the sample vial.

Turning now to FIGS. 12 and 13, there has been illustrated on exemplary apparatus for automatically positioning standards in accordance with the present invention. As here illustrated, the sample 41 includes a vial 234 made of light transmissive material and having a removable "screw-on" cap 235. In keeping with this form of the invention, the cap 235 is molded or otherwise formed with a laterally and downwardly extending passage 236 defining a compartment 238 in the cap adapted to receive a pellet 239 of a standard emitter having a known activity level. In order to maintain the pellet 239 in disoperative association with respect to the liquid scintillator contained in the vial 234, a vertically reciprocable plunger 240 is mounted in the cap, the plunger being positioned so that it normally impedes passage of the pellet into the vial 234.

Those skilled in the art will appreciate that the particular form of the standard 239 is not critical to the invention and it could have shapes other than the illustrative pellet form such, for example, as sheet, cube, strip or other forms. Moreover, the standard 239 can be made of material which is either soluble or insoluble in the solvent contained within the liquid scintillator. Finally, the standard 239 can be virtually any standard isotope of known energy level provided that it is an isotope which emits non-penetrating radiation. Preferably, however, the standard 239 will be the same isotope as that contained in the sample 41 or one having an energy spectrum similar thereto.

In carrying out this form of the invention, provision is made for automatically releasing the standard 239 whenever it is desired to place the latter in operative association with the liquid scintillator. To accomplish this, a magnet 241 is mounted in a bore 242 formed in the housing 84 and positioned so that it can be selectively projected into the elevator shaft in close proximity to the cap 235. The exemplary magnet 241 is here connected to the armature 244 of a solenoid S2 having terminals T1, T2 by means of a connecting rod 245. The connecting rod 245 passes through a tubular spring housing 246 which is rigidly secured in the bore 242, the housing 246 here containing a compression spring 248 which acts against a collar 249 integral with the rod 245 to urge the magnet 241 into its retracted position.

The arrangement is such that when a voltage source is applied across the terminals T1, T2 of the solenoid S2, the latter is energized to urge the armature to the left (as viewed in FIGS. 12 and 13) against the biasing effect of the spring 248, thus projecting the magnet 241 outwardly to the position shown in FIG. 13. This serves to magnetically attract the plunger 240, the latter having a head 250 formed of magnetic material. As a consequence, the standard emitter 239 falls into the vial 234 as shown in FIG. 13, thus automatically exposing the contents thereof to standardized radiation.

Figure 26:
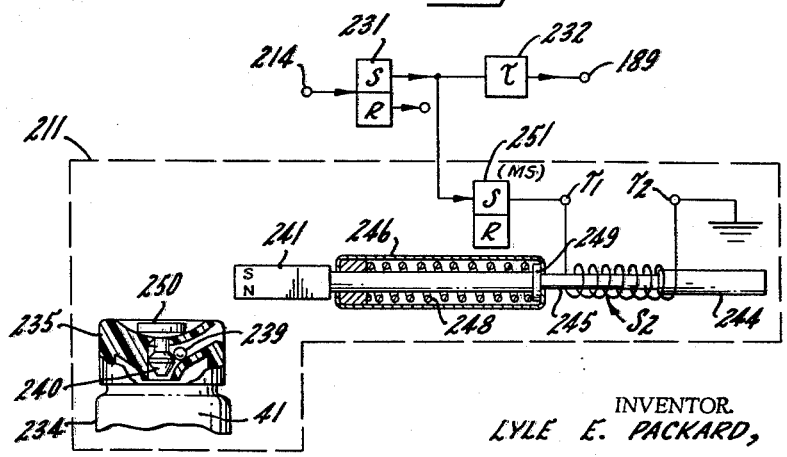
FIG. 26 is a fragmentary schematic wiring diagram of the control components utilized for positioning a standard internal emitter in accordance with the form of the invention shown in FIG. 12.

Referring now to FIGS. 26 and 24 conjointly, it will be observed that the voltage source for energizing the solenoid S2 is here derived from the "set" section S of the flip flop 231. Thus the "set" section S provides a control signal (when the flip flop is in the "set" condition) which is effective to momentarily "set" a monostable flip flop 251, thereby completing a momentary energizing circuit for the solenoid S2 and shifting the magnet 241 laterally into the elevator shaft 85 (FIG. 13).

Figure 14:
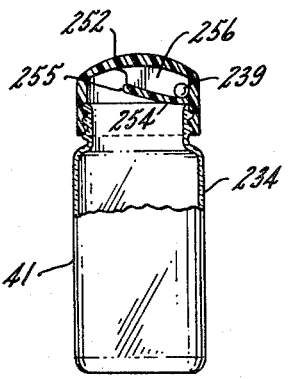
FIG. 14 is an enlarged elevational view, partly in section, of an exemplary sample vial suitable for use in positioning internal standards in accordance with another form of the invention.

Referring next to FIG. 14, there has been illustrated a slightly modified sample vial construction which will also find particularly advantageous use in connection with methods and apparatus embodying the present invention. As here illustrated, the test sample 41 includes a sample vial 234 which is identical with the vial shown in FIGS. 12 and 13. However, in this form of the invention, the sample vial 234 is closed by means of a screw-on cap 252 which is molded or otherwise formed with an interiorly disposed, integral shelf 254 positioned slightly above the threaded portion of the cap. Preferably the shelf 254 extends only partially across the cap 252, the shelf being provided with a raised lip portion 255 adjacent its free edge and sloping downwardly towards the junction of the shelf and the sidewall of the cap. The arrangement is such that the shelf 254 defines with the cap 252 a compartment 256 adapted to receive a standard emitter of non-penetrating radiation, here shown as a pellet 239 which can be either identical or similar to the pellet shown in FIGS. 12 and 13.

In order to position the standard emitter 239 in test sample 41 while maintaining the emitter and liquid scintillator disoperatively associated with one another, the technician merely inserts the pellet 239 into the compartment 256 by removing the cap and slipping the pellet over the raised lip 255. This would, of course, be most conveniently done at the same time that the liquid scintillator and substance to be analyzed are inserted into the vial 234 and, thereafter, the lip 255 will tend to inhibit inadvertent displacement of the emitter from the compartment 256 into the liquid contents of the vial.

It will be appreciated upon inspection of FIG. 14 that when it is desired to expose the liquid scintillator to radiations emanating from the standard emitter 239, it is merely necessary to tilt the test sample 41 slightly (counterclockwise as viewed in FIG. 14) until the lip 255 constitutes the lowest portion of the shelf, at which time the pellet 239 will slip or roll off the shelf and into the interior portion of the vial 234 where it is operatively associated with the liquid scintillator. Such tilting movement of the vial could be achieved in various ways. For example, the control signal passed by the "set" section S of the flip flop 231 (FIG. 24) during an "automatic standardization" cycle could be utilized to condition a solenoid, fluid system, or the like (not shown) to effect tilting movement of the entire elevator and detector mechanism A (FIG. 1).

Of course, the weight of the housing 84 and associated shielding would tend to make the foregoing system somewhat unwieldy. However, the same desired result could be achieved by tilting only a portion of the elevator and detector mechanism A. Thus referring to FIG. 9, it will be noted that when the test sample is positioned between the photomultipliers 42, 42', it is received within a "light pipe" 258 (best shown in perspective in FIG. 21), and while the "light pipe" in the exemplary forms of the invention is shown as a stationary element, it could, if desired, be pivotally mounted within the housing 84 and normally biased into a position aligned with the vertical bore defining the elevator shaft 85. In this event, the control signal passed by the "set" section S of the flip flop 231 (FIG. 24) might, for example, be effective to energize a solenoid for pivoting the "light pipe" 258 and thus tilting the sample.

Of course, either of the foregoing systems would require some means for properly orienting the cap 252 within the "light pipe" relative to the direction of pivotal movement so as to insure that the pellet 239 would fall off the shelf 254 when the latter is tilted. Such means, which might take the form of cooperable cam surfaces (not shown) on the cap and elevator shaft 85, are well known to those skilled in the art and need not be described in detail herein. Such systems and means have been only briefly described herein to show the adaptability of the sample vial construction shown in FIG. 14 for use with the electrical control system shown in FIG. 24 wherein each sample 41 is automatically counted twice while maintained within the detection chamber and, incident to completion of the first count, the standard emitter 239 is shifted into the vial 234 where it is exposed to the liquid scintillator during the second count.

Figure 15:
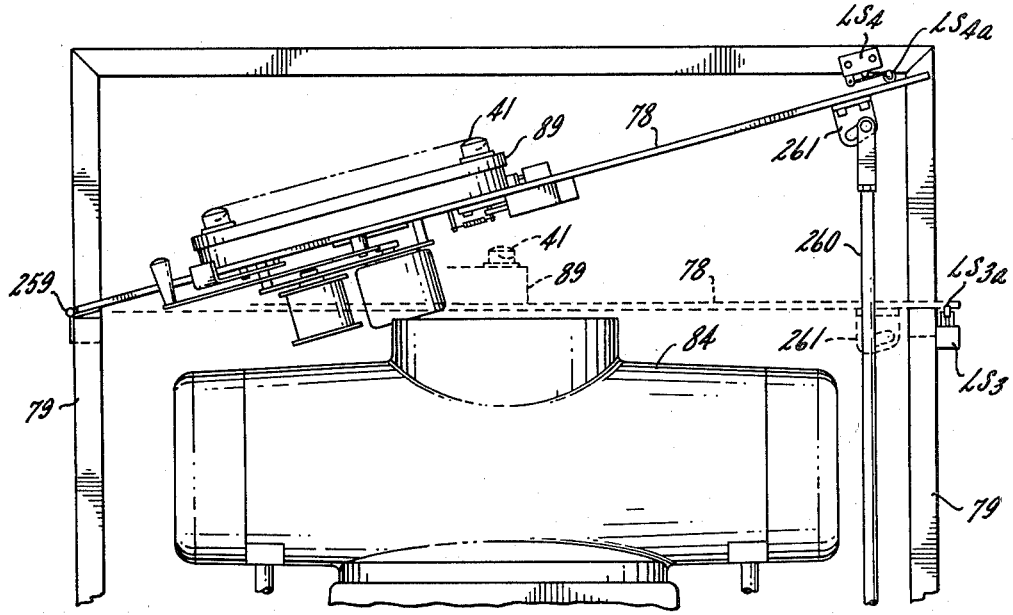
FIG. 15 is a fragmentary elevational view similar to FIG. 1, but here illustrating the apparatus for simultaneously shifting internal standards located in a plurality of sample vials of the type shown in FIG. 14 from a position disoperatively associated with the vial contents to a position operatively associated therewith.

In order to make clear one exemplary system for effecting pivotal or tilting movement of the sample vial shown in FIG. 14, reference is made to FIGS. 1 and 15 taken conjointly wherein there has been illustrated a modified sample handling system also embodying the features of the present invention. As here shown, the table 78, which serves to support and physically locate the tray 89 of samples 41 relative to the elevator and detector mechanism A, is hinged to one side frame 79 of the apparatus by a hinge 259 or similar pivotal connection. The opposite side of the table 78 is dimensioned to rest on the right side frame 79 with freedom for vertical upward movement relative thereto. To effect such vertical movement, the right side of the table 78 is coupled through a connecting rod 260 and bracket 261 to a piston and cylinder assembly, generally indicated at 262. The latter is operatively connected to a fluid source 264 and a pump 265 by means of fluid conduits 266, 268, 269 and a control valve 270. A bleed line 271 is coupled directly between the valve 270 and the fluid source 264.

As here shown, the valve 270 is selectively actuated by a solenoid S3, and is normally biased by a spring 272 into a position wherein the upper end of the piston and cylinder assembly 262 is coupled to the discharge side of the high pressure pump through the conduits 266, 268. When the solenoid S3 is deenergized (as shown in FIG. 1), the lower end of the piston and cylinder assembly 262 is coupled to the fluid source through the condit 269 and the bleed line 271. Under these conditions, the piston and cylinder assembly biases the connecting rod 260 and table 78 to a normal horizontal position as shown in FIG. 1. Conversely, when the solenoid S3 is energized, the valve 270 couples conduit 268 to the bleed line 271 and conduit 269 to the high pressure line 266, thus pressurizing the lower end of the assembly 262 and urging the right-hand side of the table 78 upwardly about the fixed hinged connection 259.

Referring to FIG. 15, it will be noted that when the table 78 is in its lower horizontal position (as depicted by the broken line position 78), the right edge of the table operatively engages and depresses the actuator LS3$_a$ of a limit switch LS3. When the table 78 is raised to its inclined solid line position, it engages and depresses the actuator LS4$_a$ of a limit switch LS4. The functions of these limit switches will be more fully described in conjunction with the control circuit shown in FIG. 25.

It will be appreciated from the foregoing description, that when the table 78 is raised to its inclined position as shown in FIG. 15, the tray 89 of samples 41 is also inclined, although the tray remains operatively engaged with the three-point centering system 121, 122, 125 (FIG. 2). Consequently, it is merely necessary to rotate the tray 89 one or more times, during which period the standard emitters 239 will all drop out of their respective compartments 256 (FIG. 14). Thus, in this form of the invention, the samples 41 are all counted once without being exposed to standardized radiation. Upon completion of, and incident to recordation of the count of observed scintillations for the last sample 41 in the tray (e.g., the twenty-fourth sample), the table 78 will be raised and the tray 89 rotated while in the inclined position, thus dropping the standard emitters 239 into the vials. Thereafter, the table is lowered and the samples recounted.

To facilitate an understanding of the mode of operation of the exemplary system shown in FIGS. 1 and 15, reference is here made to the schematic electrical control circuit shown in FIG. 25. Since the sample loading and unloading, tray indexing, and tray changing cycles are here identical to those shown and described in FIG. 24 when the Automatic Standardization Control Switch 81 is in the OFF state, they need not be again described herein. Suffice it to say that the samples 41 will be delivered to and from the detection chamber in seriatim order until such time that the twenty-fourth sample has been returned to the tray, at which time the contacts MS3–2 of the microswitch MS3 are closed and the capacitor C2 discharges therethrough to provide a "stop" signal for the Change Tray Control logic 169.

However, in this form of the invention, the capacitor discharge signal is first applied to a terminal 274 which is selectively coupled by the technician to either the OFF terminal 212 or the ON terminal 214 by the simple expedient of positioning the Automatic Standardization Control Switch 82 in the desired operational mode. When in the standardization OFF mode, the "stop" signal is passed via OFF terminal 212 directly to input terminals 226', 226" of the change tray logic 169. A control signal impressed upon terminal 226' is here effective to (1) retract the locator pin 151 on the tray indexing mechanism; (2) unlatch the gate 119 from the table 78; and (3) relatch the gate and the tray to one another. A control signal impressed upon the terminal 226" is effective to stop further operation of the equipment until such time as the tray 89 is replaced and the Mode Selector Switch 81 is again turned to the "operate" condition.

Assuming, however, that the apparatus has been conditioned for an "Automatic Standardization" operational mode by proper positioning of the switch 82, the capacitor C2 will, upon closure of the contacts MS3–2 (indicating completion of the first count for all samples contained in the tray 89), discharge through the ON terminal 214 to apply a control signal which is effective to switch the flip flop 231 to the "set" state. When this occurs, a control signal is passed from the "set" section S of the flip flop through a diode 275 to terminal 226', thereby unlatching the tray 89 from the table 78 and indexing mechanism, while relatching the gate 119 and tray 89. However, no signal is impressed upon terminal 226" at this time.

To initiate tilting movement of the table 78, the "set" section S of the flip flop is also connected through normally closed contacts R1$_a$ (controlled by a relay R1) and normally closed contacts R2$_a$ (controlled by a relay R2) to one terminal T1 of the solenoid S3 (FIGS. 1 and 25), the other terminal T2 thereof being coupled directly to ground. Thus, setting of the flip flop 231 is effective to energize the solenoid S3, thereby shifting the valve 270 and raising the table 78 to its inclined position in the manner heretofore described. As the table 78 reaches its uppermost position, it depresses the actuator LS4$_a$ of the limit switch LS4, thus closing contacts LS4–1 and LS4–2. Closure of the contacts LS4–1 is effective to complete an energizing circuit (including voltage source E3 and normally closed contacts R2$_d$ controlled by relay R2) for a solenoid S4, the armature of the latter being coupled to and serving to retract pawl 155 on the tray alignment mechanism. Consequently, when the tray 89 rotates while in the inclined position, the tray alignment mechanism cannot be "uncocked" since the latch 120 will not engage the pawl 155. Closure of the contacts LS4–2 completes an energizing circuit for the alignment motor M2, such circuit also including normally closed contacts R2$_c$ controlled by relay R2.

The tray is now driven rapidly by the friction roller 136 (FIGS. 7 and 25) and, during such rotation, the standard emitters 239 are all dropped out of their compartments 256 (FIG. 14) and into their respective vials 234.

In keeping with this aspect of the invention, provision is made for automatically deenergizing the motor M2 after a predetermined number of revolutions, returning the table 78 to its horizontal position, realigning the tray, and recounting all of the samples 41. To accomplish these objectives, the alignment motor M2 is drivingly coupled to a cam 276 which serves to momentarily close a cam switch CS once for each revolution of the output shaft for the motor. Each time that the cam switch CS closes, an input pulse is applied to the "set" section S of a monostable flip flop 278. To this end, closure of the cam switch CS momentarily couples the input terminal for the "set" section S of the flip flop 278 to a voltage source E4 through contacts 279 controlled by switch 82. The output terminal of the "set" section S of the flip flop 278 is coupled directly to a counter 280 which is depicted in block form and which can be any of various conventional types well known to those skilled in the art.

In carrying out the invention, the counter 280 is preset to pass an output signal to a monostable flip flop 281 after a predetermined number $n$ of revolutions of the tray 89. When this occurs, the flip flop 281 is driven momentarily to the "set" state so as to complete a momentary energizing circuit for the relay R2, thereby closing the normally open contacts $R2_b$ and opening the normally closed contacts $R2_a$, $R2_c$ and $R2_d$ controlled thereby. Opening of contacts $R2_c$ serves to deenergize the alignment motor M2, while opening of the contacts $R2_d$ and $R2_a$ breaks the respective energizing circuits for the solenoids S4, S3, thereby releasing the pawl 155 and shifting the valve 270 so as to again subject the upper end of the piston and cylinder assembly 262 to high pressure. The table 78 is now driven towards its down position. At the same time, closure of the contacts $R2_b$ prepares an energizing circuit for the alignment motor M2.

When the table 78 is returned to its down position, it engages and depresses the actuator $LS3_a$ for the table down limit switch LS3, thereby closing the normally open contacts of the limit switch and completing the energizing circuit for the alignment motor M2 that had been prepared upon closure of relay contacts $R2_b$. The tray 89 is now rapidly rotated until the latch 120 thereon again engages the pawl 155, at which time the tray locating mechanism is "uncocked." Uncocking of the latter mechanism serves to close the contacts of the microswitch MS1, thus applying a "stop alignment" signal on the terminal 229 of the "Change Tray" logic 169.

The apparatus is now set to recount all of the samples 41 contained in the tray 89, this time with the standard emitters 239 (FIG. 14) operatively associated with the liquid scintillator.

In order to insure that the table 78 remains in its down position, provision is made for energizing the relay R1 upon deenergization of the solenoid S3, thus opening the contacts $R1_a$ and preventing reenergization of the solenoid S3 until such time that the contacts $R1_a$ reclose. To this end, the relay R2 controls an additional set of normally open contacts $R2_e$, such contacts being disposed in an energizing circuit for the relay R1. The arrangement is such when the contacts $R2_e$ close, the relay R1 is energized by a voltage source E5 through contacts $R3_a$ controlled by a relay R3. Energization of the relay R1 opens contacts $R1_a$ and, at the same time, closes contacts $R1_b$, thereby sealing the relay R1 in through its own contacts $R1_b$.

Upon completion of a second count cycle for the tray, the contacts MS3–2 again reclose, permitting the capacitor C2 to discharge therethrough and again apply a control signal to the flip flop 231, thus switching the latter to the "reset" state. Under these conditions, a control signal is derived from the "reset" section R of the flip flop 231 which is effective to complete an energizing circuit for relay R3, thereby opening contacts $R3_a$ and deenergizing relay R1. The contacts $R1_a$ now reclose, again preparing an energizing circuit for solenoid S3. However, the solenoid is not energized again until the flip flop 231 is again "set." At the same time, the control signal derived from the "reset" section R of the flip flop 231 is applied directly to the terminals 226', 226'', thereby terminating further operation of the machine.

It will be appreciated from the foregoing, that the system described in conjunction with the control circuit shown by way of example in FIG. 25, will find particularly advantageous, but by no means exclusive, use when the standard emitters 239 (FIG. 14) are of the soluble variety. Thus, continuous rotation of the tray 89 at a rapid rate while inclined, will not only serve to displace the standards from the compartments in the receptacles, but, moreover, it will tend to promote mixing of the liquid scintillator and the standard emitter.

Thus far, the invention has been described in conjunction with methods and equipment for automatically shifting standard emitters of non-penetrating radiation into operative association with the liquid scintillator contained in the exemplary sample vials 234 shown in FIGS. 12 and 14. Emitters of non-penetrating radiation are preferred in such exemplary constructions simply because the shielding requirements when using emitters of penetrating radiation are such that it would be difficult to support the emitter in or on the sample vial while maintaining the emitter disoperatively associated with the contents of the vial. However, in its broader aspects, the invention is concerned with methods and equipment particularly suited for exposing a test sample 41 to an emitter of standardized radiation irrespective of whether the radiation emitted is of the penetrating or non-penetrating variety.

In order to permit attainment of the broader objectives of the invention, provision is made for storing standard radiation emitting means at a point remote from the sample 41 and for automatically shifting the emitting means into operative association with the test sample as an incident to completion of a first counting cycle for the sample, yet wherein the test sample is retained in place in the detection chamber. To this end, and with particular reference to FIG. 16, there has been provided a novel automatic standardization system including a supply hopper 282 which is rigidly secured to the upper surface of the table 78 at a point laterally of the tray 89 and the vertically disposed elevator shaft 85. As here shown, the supply hopper includes a base portion 284 which is made of suitable shielding material such, for example, as lead, the base portion being rigidly secured to the table by bolts or the like 285. A generally funnel-shaped hopper 286 is formed in the base portion for the purpose of storing a plurality of standard radiation emitters 288, the latter being here depicted in pellet form. To minimize the danger to personnel resulting from escaping radiation, the supply hopper preferably includes a cover 289 made of suitable shield material and hinged to the base portion so as to permit replenishment of the supply of standard emitters.

In carrying out this form of the invention, provision is made for transferring the standard emitters 288 one at a time to respective successive ones of the test samples 41 after the latter have been counted once while isolated from the emitters. To accomplish this, a rotary transfer mechanism 290 is mounted on the underside of the base portion 284, the transfer mechanism including a stationary plate 291 suspended from the base portion on brackets 292. A rotary transfer disc 294 is mounted above the plate for oscillatory movement on a shaft 295, the latter being journaled for rotation adjacent its lower end in the plate 291 and secured adjacent its upper end to the armature 296 of a rotary solenoid S5 (FIG. 17).

Figure 17:
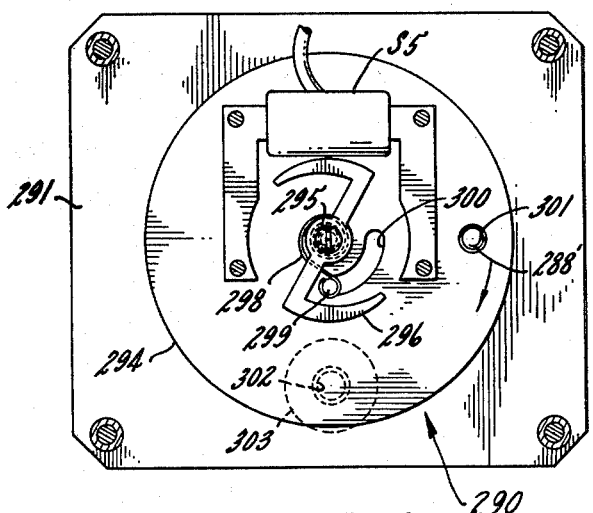
FIG. 17 is a sectional view taken substantially along the line 17—17 of FIG. 16 and depicting an exemplary mechanism for transferring standard emitters one at a time from a supply hopper to a point operatively associated with the contents of the sample vial.

The arrangement is such that when the solenoid S5 is deenergized (as shown in FIG. 17) the disc 294 is biased in a counterclockwise direction by means of a spring 298 having one end secured to the shaft 295 and its opposite end secured to a post 299. The post 299 is rigidly secured to the plate 291 and passes upwardly through an arcuate slot 300 formed in the disc 294. In this condition, coaction of the slot 300 and post 299 serves to limit movement of the disc so as to align an aperture 301 formed therein with the lower discharge end of the funnel-shaped hopper 286, thus permitting the lowermost emitter 288' to drop into the aperture where it rests on the plate 291 (as best shown in FIG. 16).

However, when the solenoid S5 is energized, the armature 296 rotates (clockwise as viewed in FIG. 17) through an angle of approximately 90 degrees and, during such rotation, the emitter 288' confined in the aperture 301 is carried on the plate 291 through an arcuate path to an aperture 302 located in the plate at a point aligned with a funnel-shaped delivery chute 303 supported on the table 78. The lower end of the chute is coupled to a delivery passage 304 formed in the housing 84 by means of a conduit 305. As here shown, the passage 304 terminates at a point in the wall of the elevator shaft 85 located immediately above the upper surface of the test sample 41. In order to permit passage of the emitter into the sample vial 234, the latter is provided with a screw-on cap 306 having a funnel-shaped passage 308 formed centrally thereof.

Thus, when the solenoid is energized and the armature 296 reaches its limit position, the emitter 288' is free to fall due to gravity through the chute 303, conduit 305, and passageway 304, from which it is discharged directly into the test sample 41 via the funnel-shaped passage 308 in the cap 306. Of course, during the period when the solenoid S5 is energized so as to transfer the emitter 288' laterally of the plate 291, the next emitter 288'' is supported on the upper surface of the transfer disc 294 but is prevented from moving laterally since it is still partially confined within the discharge end of the hopper 286. Therefore, after the emitter 288' is delivered to the test sample 41 and the solenoid S5 is deenergized, the spring 298 will function to return the disc to its initial position where the next emitter 288'' is free to drop into the aperture 301 formed therein in readiness for the standardization count for the next sample.

Turning now to FIG. 27, it will be appreciated that the form of the invention described above in conjunction with FIGS. 16 and 17 again constitutes the "position standard control" 211 depicted diagrammatically in FIG. 24. That is, signals presented at the terminal 214 will function to alternately switch the flip-flop 231 to the "set" and "reset" states and, whenever the flip flop is "set," a control signal is applied to the "set" section of a monostable flip flop 251. During the period that the latter is "set," a voltage source is coupled across the terminals T1, T2 of the solenoid S5, thus rotating the disc 294 and shifting the emitter 288' from the supply hopper to the delivery chute 303.

Of course, those skilled in the art will appreciate that the standard emitters 288 shown in FIG. 16 could be emitters of either penetrating or non-penetrating radiation. Moreover, the pellets 288 can be formed of soluble or insoluble material.

Referring next to FIG. 18, a slightly modified form of the invention has been illustrated which, in many respects, is quite similar in construction and operation to the embodiment shown in FIG. 16. However, in this instance provision is made for continuously recirculating a single standard emitter 309, thus permitting all of the test samples 41 introduced into the detection chamber to be standardized by one known radioactive source, yet wherein all of the samples can also be counted in an environment isolated from standardized radiation without requiring removal of the samples from the chamber between counts.

To this end, a storage hopper 310 is rigidly mounted on the table 78 by means of brackets 311. Provision is made in this form of the invention for selectively releasing the standard emitter 309 from the hopper 310 into a bored passageway 312 formed in the housing 84, the passageway terminating in an inclined bore 314 which intersects the elevator shaft 85 at a point just above the cap 315 of a test sample 41 positioned in the detection chamber. As here illustrated, the cap 315 is provided with a conical depression in its upper surface defining a compartment 316 adapted to position a standard emitter 309 of penetrating radiation in operative association with the contents of the vial. Since the standard 309 is an emitter of gamma or similar penetrating radiation (e.g., an encapsulated source of radium), it will be appreciated that it does not need to enter the sample vial to create a light energy spectrum therein. Rather, penetrating radiations emitted from the standard emitter 309 will cause light scintillations in the liquid scintillator through the effect of Compton interactions in the manner previously described in conjunction with FIG. 34.

In order to control the introduction of the standard emitter 309 into the compartment 316 in the sample vial cap 315, the discharge end 318 of the hopper 310 is normally closed by means of a knife-like blade 319 which extends transversely across the discharge end of the hopper and which is normally biased to a closed position by means of a spring 320 secured to the blade 319 and one of the brackets 311. In the illustrative device, the blade 319 is provided with a through aperture 321 adapted to be aligned with the discharge end 318 and the bored passageway 312 when the blade 319 is retracted by energization of a solenoid S6 having energizing terminals T1, T2. Thus, when the solenoid is energized, the emitter is free to fall through the aperture 321 into the passageways 312, 314 which communicate with the sample 41 under test.

In keeping with the present aspect of the invention, provision is made for recapturing the emitter 309 at the conclusion of the automatic standardization count cycle for each sample 41 and returning the emitter 309 to the hopper 310 in readiness for use with the next sample 41 placed in the detection chamber. To this end, the standard source material is preferably encapsulated in a film of magnetically attractable material. An electromagnet 322, having a core 324 with a coil 325 wound therearound, is coupled to the armature 326 of a solenoid S7 by means of a connecting rod 328 formed of any non-conductive, non-magnetic material, the electromagnet 322 and solenoid S7 being secured to the frame 79 of the apparatus by any suitable means (not shown). In the exemplary construction shown in FIG. 18, the electromagnet 322 and solenoid S7 are positioned above the supply hopper 310 so that the electromagnet can be selectively reciprocated by action of the solenoid to positions overlying the hopper (when the solenoid is deenergized) and the sample 41 (when the solenoid is energized) as the sample is unloaded from the elevator and detector mechanism A. Normally, however, the electromagnet 322 is biased to a position overlying the hopper 310 by means of a spring 329 connected between the frame 79 and the armature 326 of the solenoid S7.

It will be appreciated from the foregoing, that when any given sample 41 has been counted twice, the latter count having been recorded with the emitter 309 positioned in the dished compartment 316 in the cap 315, the apparatus will function to automatically eject or "unload" that sample so as to permit introduction of the new test sample into the elevator shaft 85. Consequently, in the practice of this form of the invention, it is simply necessary to energize the solenoid S7 whenever the first sample has returned to its uppermost position, shown in broken lines in FIG. 18 (or, alternatively, when the first sample has been indexed one step and while the second sample is undergoing its first count), thus projecting the electromagnet 322 laterally into a position overlying the compartment 316 in the cap 315. The electromagnet is then energized so as to magnetically attract the emitter 309. At this point, the solenoid is deenergized to permit return of the electromagnet to the solid line position shown in FIG. 18, whereupon deenergization of the electromagnet 322 permits the emitter 309 to drop into the hopper 310.

Figure 28:
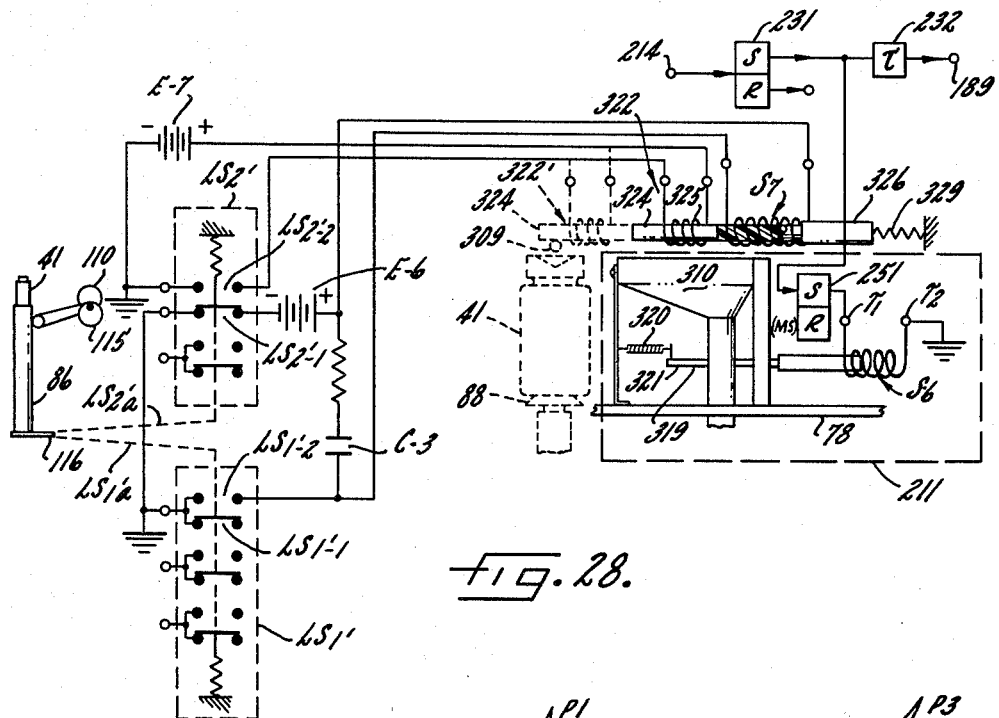
FIG. 28 is a schematic wiring diagram similar to FIG. 26, here depicting the electrical control components for recirculating a single emitter of penetrating radiation in accordance with the form of the invention shown in FIG. 18.

Referring now to the control circuit shown in FIG. 28 (taken conjointly with FIG. 24), it will be observed that the system for depositing the standard emitter 309 in the compartment 316 is quite similar to that shown in FIG. 27. That is, in this instance, alternate control signals presented on the terminal 214 will again be effective to "set" the flip flop 231, thus switching the monostable flip flop 251 to the "set" state and energizing the solenoid S6. When this occurs, the gate 319 is retracted and the emitter 309 drops through the aperture 320, the communicating passages 312, 314 (FIG. 18), and into the compartment 316 in the test sample 41. Of course, by properly dimensioning the standard emitters 309, it would also be possible to use the emitters 309 with the cap construction shown by way of example in FIG. 16. Merely by way of example, it would be entirely feasible to position any two, or all of three, supply hoppers on the table 78—the first hopper being similar to that shown at 310 in FIG. 18 and containing a single emitter 309 of penetrating radiation having a diameter greater than the minimum diameter of the funnel-shaped compartment 308 in the cap 306 (FIG. 16); and the second and third hoppers being similar to that shown at 282 in FIG. 16 with respective ones of the hoppers containing a plurality of emitters 288 of penetrating radiation and non-penetrating radiation, with each type of emitter having a diameter less than the minimum diameter of the funnel-shaped compartment 308. Thus, by energizing the control solenoid S6 (FIG. 18) associated with the hopper 310, it would be possible to expose the contents of the vial 234 in FIG. 16 to external standardization by highly penetrating emissive radiation, it being understood that the standard 309 would be too large to pass through the cap 306. On the other hand, if the technician wished to use an internal standard of penetrating radiation, he would only have to energize the control solenoid S5 associated with the hopper 282 containing the smaller diameter pellets 288 of penetrating radiation. Finally, if the technician wished to expose the test sample 41 to internal standardization by means of an isotope having low penetrating power, it would merely be necessary to energize the control solenoid associated with a hopper containing such standards.

In order to recapture a recirculatory single pellet 309 of the type shown in FIGS. 18 and 28, provision is made in the exemplary construction for cyclically energizing and deenergizing the solenoid S7 and the electromagnet 322. This may, of course, be done at any time prior to the demand for automatic standardization of the next successive test sample 41, but it is here conveniently described in conjunction with a sample unloading cycle. Referring to FIG. 28, it will be observed that limit switches LS1' and LS2' are provided which are similar to those shown and described in FIG. 24. However, in this instance each switch is provided with two extra sets of contacts here identified by the reference characters LS1'-1, LS1'-2, LS2'-1 and LS2'-2.

The arrangement is such that as the elevator 86 starts upwardly during an "unload" cycle, the flange 116 releases the actuator LS1'$_a$ of the limit switch LS1', thus opening contacts LS1'-1 and closing contacts LS1'-2. Closure of the latter contacts completes an energizing circuit (including a voltage source E6) for the solenoid S7 through the normally closed contacts LS2'-1. At the same time, a charging circuit is completed for a capacitor C3. Energization of the solenoid S7 causes the electromagnet to be shifted laterally to the broken line position 322' shown in FIG. 28 where the electromagnet overlies the elevator platform 88.

As the elevator 86 reaches its uppermost limit position (i.e., the "sample unloaded" position), the flange 116 engages the actuator LS2'$_a$ for the upper limit switch LS2', thus opening the contacts LS2'-1 and closing the contacts LS2'-2. Closure of the latter set of contacts completes an energizing circuit (including voltage source E7) for the electromagnet 322, thus magnetically attracting the standard 309. Opening of the contacts LS2'-1 breaks the energizing circuit for the solenoid S7, but the latter remains energized momentarily until the charge stored on the capacitor C3 is dissipated, thus insuring that the pellet 309 is magnetically coupled to the core 324 of the electromagnet 322. As soon as the charge on the capacitor has dissipated sufficiently, the spring 329 serves to retract the electromagnet 322 until the latter, still energized, is again positioned over the hopper 310. When the elevator 86 again starts downward with its new sample 41 supported thereon, the contacts LS2'-2 reopen, breaking the energizing circuit for the electromagnet 322 and permitting the standard emitter 309 to drop into the hopper 310 in readiness for the next operating cycle.

Figure 20:
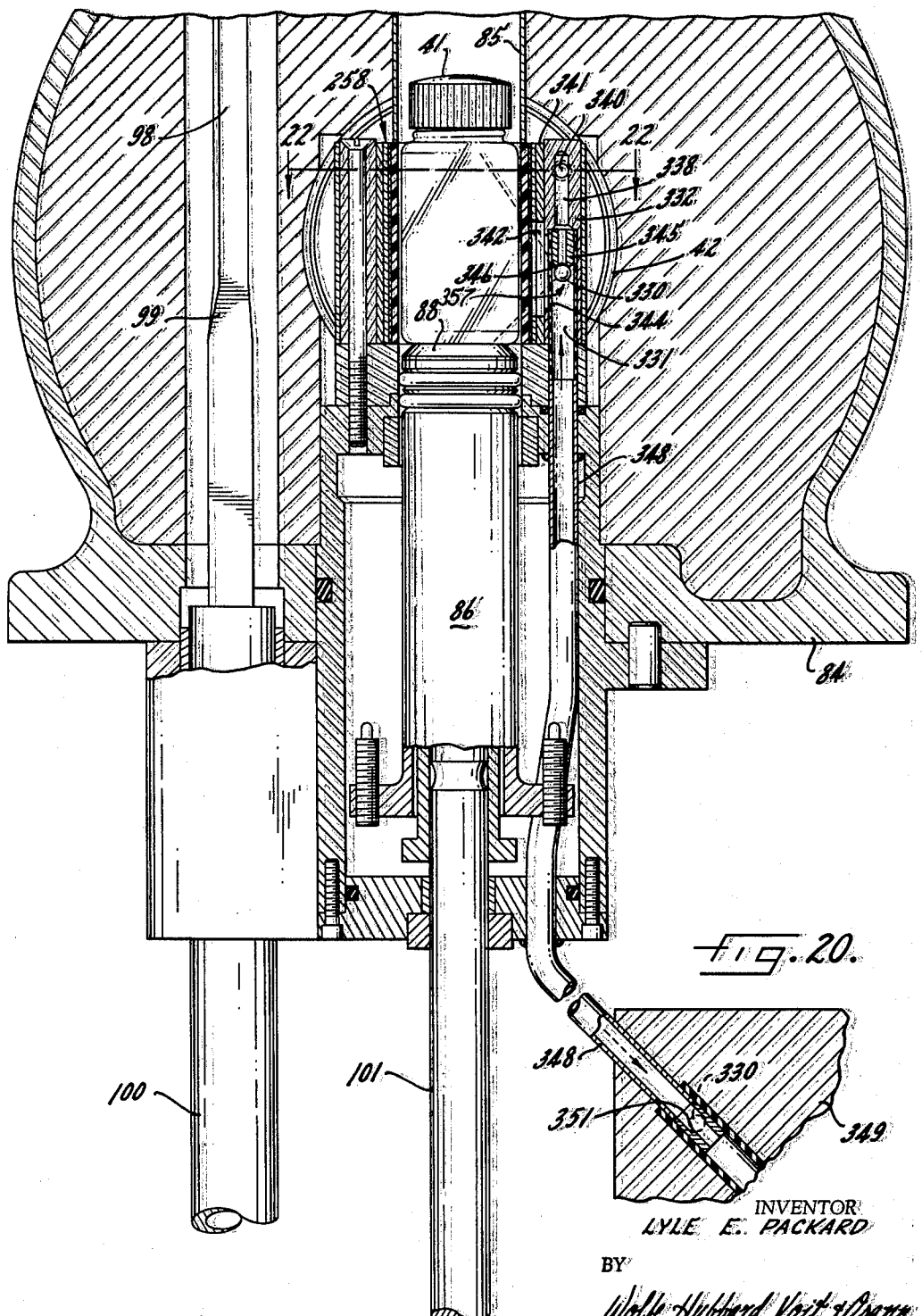
FIG. 20 is an enlarged, fragmentary sectional view similar to FIG. 19 and illustrating details of the standard positioning mechanism.

Turning next to FIGS. 19 and 20, there has been illustrated still another system for automatically exposing a test sample 41 to an external standard emitter of penetrating radiation—that is, a system wherein automatic standardization is achieved by taking advantage of the fact that an external emitter of penetrating radiation will create a light energy spectrum similar to that created by a beta emitter due to Compton interactions occurring in the sample 41. As in the form of the invention shown and described in conjunction with FIG. 18, the present construction also utilizes a single standard emitter 330 which is automatically recirculated on a cyclical basis. However, in this system recirculation is achieved independent of the position of the elevator 86 and solely as a result of completion of the preceding count cycle.

Figure 21:
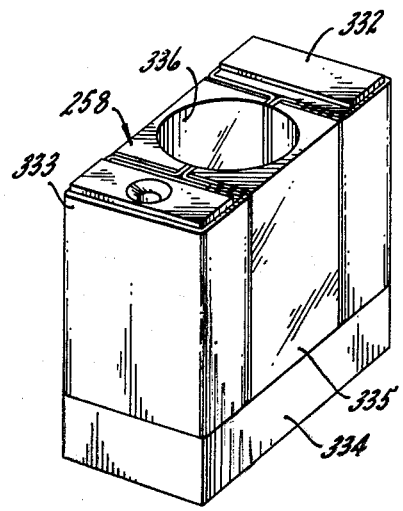
FIG. 21 is a perspective view of a typical "light pipe" used in conjunction with the form of the invention shown in FIGS. 19 and 20.
Figure 22:
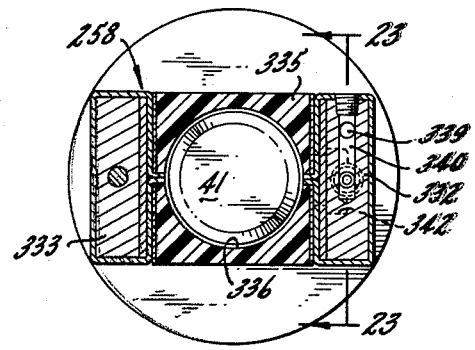
FIG. 22 is a horizontal sectional view taken substantially along the line 22—22 of FIG. 20.
Figure 23:
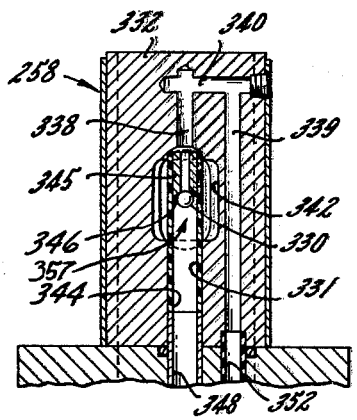
FIG. 23 is a vertical sectional view taken substantially along the line 23—23 of FIG. 22.

To accomplish this, and as best illustrated by reference to FIGS. 19–21, a vertically disposed bore 331 is formed in one sidewall 332 of the light pipe 258, the latter here including metallic sidewalls 332, 333 integral with a base portion 334. A centrally disposed block 335 (FIG. 21) of clear plastic or similar material having high light transmissive characteristics is mounted on the base portion between the sidewalls 332, 333, the block and the base portion having a through passageway 336 which here defines that portion of the elevator shaft 85 that forms the count or detection chamber. As best shown in FIG. 23, the vertically disposed bore 331 terminates in an upwardly extending passageway 338 of reduced diameter. The latter passageway is coupled to a second vertical bore 339 in the sidewall 332 by means of a transverse passage 340, the two bores 331, 339 being generally parallel to one another and to the count chamber 336. A portion of the sidewall 332 and the shielding 341 interposed between the bore 331 and the transparent hollow block 335 is cut away to define a window 342 in close proximity to any test sample 41 positioned in the count chamber 336. A tubular sleeve 344, having an internal sleeve-like tubular insert 345 defining an annular stop shoulder 346, is positioned within the bore 331 with the stop shoulder 346 positioned generally centrally of the window.

To provide for selectively and cyclically shifting the emitter 330 into engagement with the shoulder 346, the lower end of the sleeve 344 is coupled directly to a conduit 348 which extends downwardly and laterally through a shielded housing 349 to a control valve 350. A second annular shoulder 351 (FIG. 20) is formed adjacent the lower end of the conduit 348 at a point internally of the housing 349. Similarly, the bore 339 is coupled directly to the valve 350 by means of a conduit 352. The valve is, in turn, coupled through a bleed line 353 and a high pressure line 354 directly to a conventional fluid pump which may simply take the form of a pneumatic pump 355, the latter having an air inlet 356. In the exemplary form of the invention, the control valve is actuated by means of a solenoid S8 having terminals T1, T2.

The arrangement is such that when the solenoid S8 is energized, the conduit 348 is coupled directly to the high pressure line 354 of the pump 355, while the conduit 352 is coupled directly to the bleed line 353. Under these conditions, the standard emitter 330, which is confined within the conduit 348, is blown or urged upwardly within the conduit 348 until it engages the shoulder 346 (FIGS.

20 and 23) adjacent the window 342, thus exposing the test sample 41 positioned in the detection chamber 336 to radiations emanating from the standard and passing through the window. Conversely, when the solenoid is deenergized, the emitter 330 is displaced downwardly since the conduit 352 is now coupled directly to the high pressure line 354 while the conduit 348 is coupled to the low pressure line 353. Therefore, the standard emitter is shifted into engagement with the stop shoulder 351 disposed within the housing 349. It will be appreciated, therefore, that the portion of the conduit 331 adjacent the shoulder 346 and the window 342 defines a "compartment" 357 suitable for reception of the standard source 330. In this instance, however, the compartment 357, although associated with the sample vial 41 disposed in the detection chamber 336 in a manner similar to the compartments 238 (FIG. 12), 256 (FIG. 14), 308 (FIG. 16), and 316 (FIG. 18), is positioned adjacent the detection chamber rather than being formed in the sample vial itself.

Referring now to FIG. 29, it will be observed that the solenoid S8 is here coupled directly to the "set" section S of the flip flop 231. Alternate signals presented on the terminal 214 will be effective to cyclically "set" and "reset" the flip flop in the manner heretofore described and, when the latter is "set," the terminals T1, T2 of the solenoid are connected directly to a voltage source, thus energizing the solenoid and shifting the valve 350 to a position wherein the high pressure line 354 is coupled to the conduit 348, thereby urging the emitter 330 into operative association with the test sample 41 in the detection chamber 336 (FIG. 20). Conversely, when the flip flop 231 is reset, the solenoid S8 is deenergized and the standard 330 is blown or urged downwardly into the shielded housing 349.

It will be appreciated by those skilled in the art that the present invention will find particularly advantageous use in connection with automatic standardization techniques utilizing either external or internal standard sources, as well as sources that are soluble or insoluble. Moreover, since such standards are cyclically and automatically shifted into operative association with the particular sample under test without requiring any manual manipulation of either the sample or the standard, the ability to accurately process test samples on a rapid repetitive basis is substantially enhanced.

Of course, while it will be understood that the present invention will find particularly advantageous use in conjunction with automatic sample changers capable of handling a plurality of samples on a repetitive basis, it is not necessarily restricted to use with a changer capable of handling a particular number of samples such as the twenty-four samples handled in the exemplary tray 89. To the contrary, the invention will find equally effective use in automatically processing any number $n$ of samples where "$n$" can be "1" or any whole number multiple thereof. Consequently, the term "$n$" as used in the appended claims is intended to connote any number of samples from a minimum of one sample to the maximum capacity of the sample changer, it being understood that each sample will be automatically subjected to two counting operations—one with and one without exposure to standardized radiation.

Those skilled in the art will also appreciate that a "standard radioactive source," or "standard radioactive source material," will embrace any source of standardized radioactivity irrespective of whether such source comprises a single isotope suitable for use with "single-label" samples or a plurality of isotopes suitable for use with "multiple-label" samples (i.e., samples containing two or more isotopes), and it is in this context that such phrases have been used in the appended claims. It is only necessary that such sources of standardized radioactivity be capable of producing a "known energy spectrum"—that is, an energy spectrum having a known shape and quantitatively representative of a known activity strength or level, for example, in terms of decay events or counts per unit of time such as d.p.m. (decay events per minute) or c.p.m. (counts per minute).

I claim as my invention:

1. A method of producing quantitative indications of the degree of quenching occurring in $n$ discrete samples each having a radioactive isotope disposed in one of $n$ vials of a liquid scintillator comprising the steps of introducing the $n$ sample vials containing the radioactive isotope into a detection chamber one at a time in seriatim order, positioning standard radioactive source material at a location remote from and in disoperative association with the liquid scintillator in all of the $n$ vials, counting the light scintillations created in the scintillator by decay events occurring in the isotope contained within each of the $n$ vials, recording as $n$ first counts the total number of scintillations counted for each of said $n$ vials, creating a control signal when each of said $n$ first counts are recorded, automatically shifting a known quantum of said source material in response to creation of at least one of said control signals to a position operatively associated with the liquid scintillator in all of the $n$ vials so as to expose each of the latter to radiations emanating from the known quantum of standard radioactive source material, recounting the light scintillations created in each of the $n$ sample vials by the composite effect of (1) decay events occurring in the isotope contained within the respective $n$ vials and (2) decay events occurring in the standard source material to establish $n$ second counts, and comparing each of the $n$ second counts with corresponding respective ones of the recorded $n$ first counts.

2. The method as defined in claim 1 further characterized in that each of the $n$ samples is automatically exposed to the standard source material as an incident to creation of a control signal representative of recordation of its first count and then recounted while still positioned within the detection chamber.

3. The method as defined in claim 1 further characterized in that all of the $n$ samples are (1) counted in seriatim order to establish the $n$ first counts, (2) exposed to the standard source material as an incident to creation of the control signal representative of recordation of the last of the $n$ first counts, and (3) then recounted in seriatim order to establish the $n$ second counts for purposes of comparison with the respective ones of the recorded $n$ first counts.

4. A method of producing quantitative indications of the degree of quenching occurring in $n$ discrete samples each having a radioactive isotope disposed in one of $n$ vials of a liquid scintillator comprising the steps of introducing the $n$ sample vials containing the radioactive isotope into a detection chamber one at a time in seriatim order, positioning a plurality of standard radioactive sources of non-penetrating radiations in disoperative association with the liquid scintillator in each of the $n$ vials, counting the light scintillations created in the scintillator by decay events occurring in the isotope contained within each of the $n$ vials, recording as $n$ first counts the total number of scintillations counted for each of said $n$ vials, automatically shifting one of the sources relative to one of the $n$ sample vials as an incident to recordation of one of the $n$ first counts so as to place the shifted source in operative association with the contents of an associated vial, recounting the light scintillations created in each of the $n$ sample vials by the composite effect of (1) decay events occurring in the isotope contained within the respective $n$ vials and (2) decay events occurring in the shifted standard radioactive source to establish $n$ second counts, and comparing each of the $n$ second counts with corresponding respective ones of the recorded $n$ first counts.

5. A method of producing quantitative indications of the degree of quenching occurring in $n$ discrete samples each having a radioactive isotope disposed in one of $n$ vials of a liquid scintillator comprising the steps of introducing the $n$ sample vials containing the radioactive isotope into a detection chamber one at a time in seriatim order, positioning a plurality of standard radioactive sources of penetrating radiations in disoperative association with the liquid scintillator in all of the $n$ vials, counting the light scintillations created in the scintillator by decay events occurring in the isotope contained within each of the $n$ vials, recording as $n$ first counts the total number of scintillations counted for each of said $n$ vials, automatically shifting one of the sources relative to one of the $n$ sample vials as an incident to recordation of the first count for that vial so as to place the shifted source in operative association with the contents of that vial, recounting the light scintillations created in each of the $n$ sample vials by the composite effect of (1) decay events occurring in the isotope contained within the respective $n$ vials and (2) decay events occurring in the shifted standard radioactive source to establish $n$ second counts, and comparing each of the $n$ second counts with corresponding respective ones of the recorded $n$ first counts.

6. A method of producing quantitative indications of the degree of quenching occurring in $n$ discrete samples each having a radioactive isotope disposed in one of $n$ vials of a liquid scintillator comprising the steps of introducing the $n$ sample vials containing the radioactive isotope into a detection chamber one at a time in seriatim order, positioning a standard radioactive source of non-penetrating radiations in each vial in disoperative association with the liquid scintillator in all of the $n$ vials, counting the light scintillations created in the scintillator by decay events occurring in the isotope contained within each of the $n$ vials, recording as $n$ first counts the total number of scintillations counted for each of said $n$ vials, automatically shifting the standard source in each of the $n$ sample vials as an incident to recordation of the first count for that vial so as to place the shifted source in operative association with the contents of its associated vial while the latter is maintained in place within the detection chamber, recounting the light scintillations created in each of the $n$ sample vials by the composite effect of (1) decay events occurring in the isotope contained within the respective $n$ vials and (2) decay events occurring in the shifted standard radioactive source to establish $n$ second counts, and comparing each of the $n$ second counts with corresponding respective ones of the recorded $n$ first counts.

7. A method of producing quantitative indications of the degree of quenching occurring in $n$ discrete samples each having a radioactive isotope disposed in one of $n$ vials of a liquid scintillator comprising the steps of introducing the $n$ sample vials containing the radioactive isotope into a detection chamber one at a time in seriatim order, positioning a standard radioactive source of non-penetrating radiations in each vial in disoperative association with the liquid scintillator in all of the $n$ vials, counting the light scintillations created in the scintillator by decay events occurring in the isotope contained within each of the $n$ vials, recording as $n$ first counts the total number of scintillations counted for each of said $n$ vials, automatically shifting the standard radioactive sources in all of the $n$ sample vials as an incident to recordation of the last of the $n$ first counts so as to place the shifted sources in operative association with the contents of their respective vials, recounting the light scintillations created in each of the $n$ sample vials by the composite effect of (1) decay events occurring in the isotope contained within the respective $n$ vials and (2) decay events occurring in the shifted standard radioactive source to establish $n$ second counts, and comparing each of the $n$ second counts with corresponding respective ones of the recorded $n$ first counts.

8. A method of producing quantitative indications of the degree of quenching occurring in $n$ discrete samples each having a radioactive isotope disposed in one of $n$ vials of a liquid scintillator comprising the steps of positioning the $n$ samples in a sample support, indexing the support to align the samples with a detection chamber in seriatim order, introducing the $n$ sample vials containing the radioactive isotope into the detection chamber one at a time in seriatim order, positioning a standard radioactive source of non-penetrating radiations in each vial in disoperative association with the liquid scintillator in all of the $n$ vials, counting the light scintillations created in the scintillator by decay events occurring in the isotope contained within each of the $n$ vials, recording as $n$ first counts the total number of scintillations counted for each of said $n$ vials, returning each sample to the support as an incident to recordation of its first count, tilting the support as an incident to return of the last of the $n$ vials to the support so as to shift all of the standard sources into operative association with the contents of their respective vials, reintroducing the $n$ sample vials into the detection chamber one at a time in seriatim order, recounting the light scintillations created in each of the $n$ sample vials by the composite effect of (1) decay events occurring in the isotope contained within the respective $n$ vials and (2) decay events occurring in the shifted standard radioactive source to establish $n$ second counts, and comparing each of the $n$ second counts with corresponding respective ones of the recorded $n$ first counts.

9. A method of producing quantitative indications of the degree of quenching occurring in $n$ discrete samples each having a radioactive isotope disposed in one of $n$ vials of a liquid scintillator comprising the steps of positioning the $n$ samples in an annular sample support, indexing the support to align the samples with a detection chamber in seriatim order, introducing the $n$ sample vials containing the radioactive isotope into the detection chamber one at a time in seriatim order, positioning a standard radioactive source of non-penetrating radiations in each vial in disoperative association with the liquid scintillator in all of the $n$ vials, counting the light scintillations created in the scintillator by decay events occurring in the isotope contained within each of the $n$ vials, recording as $n$ first counts the total number of scintillations counted for each of said $n$ vials, returning each sample to the support as an incident to recordation of its first count, tilting the support as an incident to return of the last of the $n$ vials to the support, rotating the support while the latter is tilted so as to shift all of the standard sources into operative association with the contents of their respective vials, reintroducing the $n$ sample vials into the detection chamber one at a time in seriatim order, recounting the light scintillations created in each of the $n$ sample vials by the composite effect of (1) decay events occurring in the isotope contained within the respective $n$ vials and (2) decay events occurring in the shifted standard radioactive source to establish $n$ second counts, and comparing each of the $n$ second counts with corresponding respective ones of the recorded $n$ first counts.

10. The method of producing quantitative indications of the degree of quenching occurring in $n$ discrete samples each having a radioactive isotope disposed in one of $n$ vials of a liquid scintillator comprising the steps of introducing the $n$ sample vials containing the radioactive isotope into a detection chamber one at a time in seriatim order, positioning a standard radioactive source in a compartment within each vial in normally disoperative association with the liquid scintillator contained within each of said $n$ vials, counting the light scintillations created within the liquid scintillator by decay events occurring in the isotope contained within each of the $n$ vials, recording as $n$ first counts the total number of scintillations counted for each of said $n$ vials, automatically shifting each of the standard radioactive sources relative to each of the $n$ vials as an incident to recordation of one of the $n$ first counts so as to drop the source from the compartment into the liquid scintillator and expose the latter to radiations emanating therefrom as a result of decay events occurring therein, recounting the light scintillations created in each of the $n$ sample vials by the composite effect of (1) decay events occurring in the isotope contained within each of the respective $n$ vials and (2) decay events occurring in the standard radioactive sources so as to establish $n$ second counts, and comparing each of the $n$ second counts with corresponding respective ones of the recorded $n$ first counts.

11. The method as defined in claim 10 further characterized in that each standard radioactive source is shifted relative to its vial by tilting the latter so that the source falls out of the compartment into the vial contents.

12. The method as defined in claim 10 further characterized in that each standard radioactive source is shifted relative to its vial by opening a normally closed discharge passage interconnecting the compartment and the portion of the vial containing the liquid scintillator.

13. The method of producing quantitative indications of the degree of quenching occurring in $n$ discrete samples each having a radioactive isotope disposed in one of $n$ vials of a liquid scintillator comprising the steps of creating a compartment associated with each of the $n$ vials and having its interior normally spaced from the liquid contents of the vial, positioning $n$ standard radioactive sources within the compartments associated with respective different ones of the $n$ vials with each source normally disoperatively associated with the liquid scintillator, introducing the $n$ sample vials containing the radioactive isotope into a detection chamber one at a time in seriatim order, counting the light scintillations created within the liquid scintillator by decay events occurring in the isotope contained within each of the $n$ vials, recording as $n$ first counts the total number of scintillations counted for each of said $n$ vials, automatically shifting the standard radioactive source as an incident to recordation of one of the $n$ first counts to bring the source into operative association with the liquid scintillator contained in each of the $n$ sample vials so as to expose the liquid scintillator to radiations emanating therefrom as a result of decay events occurring therein, recounting the light scintillations created in each of the $n$ sample vials by the composite effect of (1) decay events occurring in the isotope contained within the respective $n$ vials, and (2) decay events occurring in the standard radioactive source so as to establish $n$ second counts, and comparing each of the $n$ second counts with corresponding respective ones of the recorded $n$ first counts.

14. The method of producing quantitative indications of the degree of quenching occurring in a plurality of discrete samples each having a radioactive isotope disposed in one of a corresponding plurality of vials of a liquid scintillator comprising the steps of introducing the sample vials containing the radioactive isotope into a detection chamber one at a time in seriatim order, positioning a plurality of standard radioactive sources at a point remote from the detection chamber, counting the light scintillations created within the liquid scintillator by decay events occurring in the isotope contained within each of the vials, recording as a plurality of first counts the total number of scintillations counted for each of said vials, creating a control signal when each of said first counts are recorded, retaining each of said sample vials in place within the detection chamber upon completion and recordation of their associated first counts, automatically shifting one of the standard radioactive sources as an incident to creation of the control signal representative of recordation of the first count for each of said samples from said remote point to a point within the liquid scintillator contained in respective different ones of the sample vials while the latter are retained in place within the detection chamber so as to expose the liquid scintillator to radiations emanating therefrom as a result of decay events occurring therein, recounting the light scintillations created in each of the sample vials by the composite effect of (1) decay events occurring in the isotope contained within the respective vials, and (2) decay events occurring in the standard source so as to establish a plurality of second counts, and comparing each of the second counts with corresponding respective ones of the recorded first counts.

15. The method of producing quantitative indications of the degree of quenching occurring in a plurality of discrete samples each having a radioactive isotope disposed in one of a corresponding plurality of vials of a liquid scintillator comprising the steps of creating a compartment associated with each of the vials and having its interior normally spaced from the liquid contents of the vial, introducing the sample vials containing the radioactive isotope into a detection chamber one at a time in seriatim order, positioning at least one standard radioactive source of penetrating radiation at a point remote from the detection chamber, counting the light scintillations created within the liquid scintillator by decay events occurring in the isotope contained within each of the vials, recording as a plurality of first counts the total number of scintillations counted for each of said vials, creating a control signal when each of said first counts are recorded, retaining each of said sample vials in place within the detection chamber upon completion and recordation of their associated first counts, automatically shifting the standard radioactive source as an incident to creation of the control signal representative recordation of the first count for each of said samples while the latter are retained in place within the detection chamber so as to transfer the standard source from the remote point to the compartment associated with the particular one of the sample vials then located in the detection chamber and expose the liquid scintillator therein to penetrating radiation emanating from the shifted source as a result of decay events occurring therein, recounting the light scintillations created in each of the sample vials by the composite effect of (1) decay events occurring in the isotope contained within the respective vials and (2) decay events occurring in the shifted standard radioactive source so as to establish a plurality of second counts, and comparing each of the second counts with corresponding respective ones of the recorded first counts.

16. The method of producing quantitative indications of the degree of quenching occurring in $n$ discrete samples each having a radioactive isotope in one of $n$ vials of a liquid scintillator comprising the steps of introducing the $n$ sample vials containing the radioactive isotope into a detection chamber one at a time in seriatim order, positioning a single standard radioactive source at a point remote from the detection chamber, counting the light scintillations created within the liquid scintillator by decay events occurring in the isotope contained within each of $n$ vials, recording as $n$ first counts the total number of scintillations counted for each of said $n$ vials, automatically shifting the standard radioactive source as an incident to recordation of each of the $n$ first counts to bring said source into operative association with the liquid scintillator contained in each of the $n$ sample vials so as to expose the liquid scintillator to radiations emanating therefrom as a result of decay events occurring therein, recounting the light scintillations created in each of the $n$ sample vials by the composite effect of (1) decay events occurring in the isotope contained within the respective $n$ vials and (2) decay events occurring in the shifted standard radioactive source so as to establish $n$ second counts, automatically returning the standard radioactive source to said remote point upon completion of each said $n$ second counts, and comparing each of the $n$ second counts with corresponding respective ones of the recorded $n$ first counts.

17. The method of producing quantitative indications of the degree of quenching occurring in $n$ discrete samples each having a radioactive isotope disposed in one of $n$ vials of a liquid scintillator comprising the steps of creating a compartment associated with each of the $n$ vials and having its interior normally spaced from the liquid contents of the vial, introducing the $n$ sample vials containing the radioactive isotope into a detection chamber one at a time in seriatim order, positioning a single standard radioactive source of penetrating radiations at a point remote from the detection chamber, counting the light scintillations created within the liquid scintillator by decay events occurring in the isotope contained within each of the $n$ vials, recording as $n$ first counts the total number of scintillations counted for each of said $n$ vials, automatically shifting the standard radioactive source as an incident to recordation of each of the $n$ first counts to position the source in the compartment associated with the vial then loaded in the detection chamber so as to expose the liquid scintillator to standardized penetrating radiation, recounting the light scintillations created in each of the $n$ sample vials by the composite effect of (1) decay events occurring in the isotope contained within the respective $n$ vials and (2) decay events occurring in the shifted standard source so as to establish $n$ second counts, automatically returning the radioactive source to said remote point upon completion of each of said $n$ second counts, and comparing each of the $n$ second counts with corresponding respective ones of the recorded $n$ first counts.

18. The method of producing quantitative indications of the degree of quenching occurring in $n$ discrete samples each having a radioactive isotope disposed in one of $n$ vials of a liquid scintillator comprising the steps of introducing the $n$ sample vials containing the radioactive isotope into a detection chamber one at a time in seriatim order, positioning a single standard radioactive source of penetrating radiations in a conduit at a point remote from the detection chamber, counting the light scintillations created within the liquid scintillator by decay events occurring in the isotope contained within each of the $n$ vials, recording as $n$ first counts the total number of scintillations counted for each of said $n$ vials, automatically pressurizing one end of the conduit as an incident to recordation of one of the $n$ first counts to shift the standard radioactive source to a point adjacent the detection chamber and operatively associated with the liquid scintillator contained in the one of said $n$ sample vials then disposed in the detection chamber, recounting the light scintillations created in each of the $n$ sample vials by the composite effect of (1) decay events occurring in the isotope contained within the respective $n$ vials and (2) decay events occurring in the shifted standard source so as to establish $n$ second counts, automatically pressurizing the opposite end of the conduit upon completion of each said $n$ second counts to return the standard source to said remote point, and comparing each of the $n$ second counts with corresponding respective ones of the recorded $n$ first counts.

19. Radioactivity spectrometry apparatus for use in analyzing test samples of the type including a light transmissive sample vial having a liquid scintillator and having a radioactive isotope disposed therein, said apparatus comprising, in combination, a housing defining a shielded detection chamber, means for introducing said test samples into said chamber one at a time, means defining an emitter of radiations characterized by its ability to produce a known energy spectrum and supported in disoperative association with respect to the liquid scintillator introduced into said chamber, means supported in said housing and positioned adjacent said chamber for producing output signals proportional to the energy of light scintillations occurring within said chamber, means for counting at least certain of the output signals produced during first and second counting periods, means responsive to termination of said first counting period for automatically exposing the liquid scintillator in said chamber while the associated test sample is disposed in said chamber to the radiations emanating from said emitter so that light scintillations are created in the liquid scintillator during said second counting period by both decay events occurring in the isotope and standardized radiations emanating from the emitter, and means for ejecting said test samples from said detection chamber only after said counting means has counted at least certain of the output signals produced by the composite effect of decay events occurring in said isotope and standardized radiations emanating from said emitter.

20. Radioactivity spectrometry apparatus for use in analyzing $n$ test samples each including a light transmissive sample vial containing a liquid scintillator and a radioactive isotope disposed therein, said apparatus comprising, in combination, a housing defining a shielded detection chamber, means for positioning a support containing said $n$ test samples in proximate relation to and exterior of said chamber, means for causing relative indexing movement between said support and said housing so as to permit seriatim transfer of said $n$ test samples to and from said detection chamber, means for transferring said test samples from said support to said chamber, means for supporting a standard radiation emitter characterized by its ability to produce a known energy spectrum in disoperative association with respect to the liquid scintillator introduced into said chamber, means supported in said housing and positioned adjacent said chamber for producing output signals proportional to the energy of light scintillations occurring within said chamber, means for counting at least certain of the output signals produced during first and second counting periods, and means responsive to termination of said first counting period for each of said $n$ test samples for automatically exposing the liquid scintillator in said chamber to radiations emanating from said standard emitter so that light scintillations are created in the liquid scintillator during said second counting period by both decay events occurring in the isotope and radiations emanating from the standard emitter, said sample transfer means adapted to return each of said $n$ samples to said support upon completion of said second counting period during which at least certain of the light scintillations created by both the isotope and the standard emitter are detected and counted.

21. Radioactivity spectrometry apparatus for use in analyzing $n$ test samples each including a light transmissive sample vial containing a liquid scintillator and a radioactive isotope disposed therein, said apparatus comprising, in combination, a housing defining a shielded detection chamber, means for positioning a support containing said $n$ test samples in proximate relation to and exterior of said chamber, means for causing relative indexing movement between said support and said housing so as to permit seriatim transfer of said $n$ test samples to and from said detection chamber, means for transferring said test samples from said support to said chamber, means for supporting a standard radioactive emitter characterized by its ability to produce a known energy spectrum in disoperative associataion with respect to the liquid scintillator introduced into said chamber, means supported in said housing and positioned adjacent said chamber for producing output signals proportional to the energy of light scintillations occurring within said chamber, means for counting at least certain of the output signals produced during first and second counting periods, means for recording as $n$ first counts those signals counted during said first counting period representative of scintillations created by only the isotope positioned in said $n$ test samples, and means responsive to recordation of one of said $n$ first counts for automatically exposing each of said $n$ test samples to standardized radiation emanating from said emitter so that light scintillations are created in the $n$ test samples during said second counting period by both decay events occurring in the isotope and radiations emanating from the standard emitter, said recording means adapted to record as $n$ second counts those signals counted representative of scintillations created by both said isotope and said standard emitter, and said sample transfer means adapted to return each of said $n$ samples to said support upon completion of a counting cycle.

22. Radioactivity spectrometry apparatus for use in analyzing test samples of the type including a light transmissive sample vial having a liquid scintillator and a radioactive isotope disposed therein, said apparatus comprising, in combination, a housing defining a shielded detection chamber, means for introducing said test samples into said chamber one at a time, means defining at least one standard radioactive source characterized by its ability to produce a known energy spectrum and supported in disoperative association with respect to the liquid scintillator introduced into said chamber, means supported in said housing and positioned adjacent said chamber for producing output signals proportional to the energy of light scintillations occurring within said chamber, means for counting at least certain of the output signals produced during first and second counting periods, means responsive to termination of one of said first and second counting periods for automatically exposing the liquid scintillator in said chamber while the associated test sample is disposed in said chamber to the radiations emanating from said standard source so that light scintillations are created in the liquid scintillator by decay events occurring in both the isotope and said standard radioactive source, means responsive to termination of said second counting period for automatically ejecting said test samples from said detection chamber only after said counting means has counted at least certain of the output signals produced during both said first and second counting periods.

23. Radioactivity spectrometry apparatus for use in analyzing $n$ test samples each including a light transmissive sample vial containing a liquid scintillator and a radioactive isotope disposed therein, said apparatus comprising in combination, a housing defining a shielded detection chamber, means for positioning a support containing said n test samples in proximate relation to and exterior of said chamber, means for causing relative indexing movement between said support and said housing so as to permit seriatim transfer of said $n$ test samples to and from said detection chamber, means for transferring said test samples from said support to said chamber, means for supporting a standard radioactive source characterized by its ability to produce a known energy spectrum in disoperative association with respect to the liquid scintillator introduced into said chamber, means supported in said housing and positioned adjacent said chamber for producing output signals proportional to the energy of light scintillations occurring within said chamber, means for counting at least certain of the output signals produced during first and second counting periods, means responsive to termination of one of said first and second counting periods for automatically exposing the liquid scintillator in said chamber to radiations emanating from said standard source so that light scintillations are created in the liquid scintillator by decay events occurring in both the isotope and said standard radioactive source, and means responsive to termination of said second counting period for automatically activating said sample transfer means so as to return each of said $n$ samples to said support upon completion of said first and second counting periods.

24. Radioactivity spectrometry apparatus for use in analyzing $n$ test samples each including a light transmissive sample vial containing a liquid scintillator and a radioactive isotope disposed therein, said apparatus comprising, in combination, a housing defining a shielded detection chamber, means for positioning a support containing said $n$ test samples in proximate relation to and exterior of said chamber, means for causing relative indexing movement between said support and said housing so as to permit seriatim transfer of said $n$ test samples to and from said detection chamber, means for transferring said test samples from said support to said chamber, means for supporting a standard radioactive source characterized by its ability to produce a known energy spectrum in disoperative association with respect to the liquid scintillator introduced into said chamber, means supported in said housing and positioned adjacent said chamber for producing output signals proportional to the energy of light scintillations occurring within said chamber, means for counting at least certain of the output signals produced, means for recording as $n$ first counts those signals counted representative of scintillations created by only the isotope positioned in said $n$ test samples, means responsive to recordation of at least one of said $n$ first counts for automatically exposing each of said $n$ test samples to standardized radiations emanating from said standard radioactive source so that light scintillations are created in the $n$ test samples by both decay events occurring in the isotope and radiations emanating from the standard source, said recording means adapted to record as $n$ second counts those signals counted representative of scintillations created by both said isotope and said standard source, and means responsive to recordation of at least one of said $n$ second counts for automatically activating said sample transfer means so as to return each of said $n$ samples to said support upon completion of a counting cycle therefor.

25. Radioactivity spectrometry apparatus as defined in claim 24 further characterized in that said means for automatically exposing each of said $n$ test samples to standardized radiation is rendered operative in response to recordation of each of said $n$ first counts, and said means for automatically activating said sample transfer means is rendered operative in response to recordation of each of said $n$ second counts, whereby each of said $n$ test samples is automatically subjected to two counting periods in each counting cycle while retained in place in said detection chamber.

26. Radioactivity spectrometry apparatus as defined in claim 24 further characterized in that said means for automatically exposing each of said $n$ test samples to standardized radiation is rendered operative in response to recordation of the last of said $n$ first counts, and said means for automatically activating said sample transfer means is rendered operative in response to recordation of the last of said $n$ second counts, whereby each of said $n$ test samples is automatically subjected to two counting cycles after each of which said samples are returned to said support.

27. Radioactivity spectrometry apparatus for use in analyzing test samples of the type including a light transmissive sample vial having a liquid scintillator and a radioactive isotope disposed therein, said vial having a compartment formed therein adapted to receive and support a standard radioactive source characterrized by its ability to produce a known energy spectrum, said apparatus comprising, in combination, a housing defining a shielded detection chamber, means for introducing said test samples into said chamber one at a time, means supported in said housing and positioned adjacent said chamber for producing output signals proportional to the energy of light scintillations occurring within said chamber, means for recording as a first count at least certain of the output signals produced by radiations emanating from said isotope, means responsive to recordation of said first count for automatically discharging the standard source positioned in the compartment of the vial located in the detection chamber so that the source drops into the scintillator and light scintillations are created in the liquid scintillator by decay events occurring in both the isotope and the standard source, said recording means adapted to record as a second count at least certain of the output signals produced by radiations from both said isotope and the standard source, and means for ejecting said test samples from said detection chamber.

28. Radioactivity spectrometry apparatus for use in analyzing test samples comprising, in combination, a light transmissive sample vial adapted to contain a liquid scintillator and a radioactive isotope disposed therein, said vial having a compartment formed therein adapted to receive and support a standard radioactive source characterized by its ability to produce a known energy spectrum, a discharge passage interconnecting said compartment and the contents of said vial, a plunger having a head portion formed of magnetically attractable material, said plunger mounted in said vial for movement relative thereto between a position normally closing said passage and a position opening said passage, a housing defining a shielded detection chamber, means for introducing said test samples into said chamber one at a time, means supported in said housing and positioned adjacent said chamber for producing output signals proportional to the energy of light scintillations occurring within said chamber, means for counting at least certain of the output signals produced during successive counting periods, a magnet positioned in said housing and movable between a normal first position remote from said detection chamber and a second position adjacent said head, means responsive to termination of a given counting period for automatically shifting said magnet from said first to said second position so as to momentarily attract said plunger head and open said passage whereupon the standard source is free to drop into the scintillator and light scintillations are created in the liquid scintillator by decay events occurring in both the isotope and the standard source, and means for ejecting said test samples from said detection chamber.

29. Radioactivity spectrometry apparatus for use in analyzing test samples comprising, in combination, a light transmissive sample vial adapted to contain a liquid scintillator and a radioactive isotope disposed therein, said vial having a shelf integral therewith and extending partially across the vial for reception and storage of a standard radioactive source characterized by its ability to produce a known energy spectrum, said shelf having an upwardly extending lip adjacent one edge thereof, a housing defining a shielded detection chamber, means for introducing said test samples into and removing said samples from said chamber one at a time, means supported in said housing and positioned adjacent said chamber for producing output signals proportional to the energy of light scintillations occurring within said chamber, means for counting at least certain of the output signals produced during successive counting periods, and means responsive to termination of a given counting period for automatically tilting said vial so as to discharge the standard source positioned on said shelf over said lip and into the scintillator contained within said vial whereupon light scintillations are created in the liquid scintillator by decay events occurring in both the isotope and the standard source.

30. Radioactivity spectrometry apparatus for use in analyzing $n$ test samples comprising, in combination, $n$ light transmissive sample vials each adapted to contain a liquid scintillator and a radioactive isotope disposed therein, a normally horizontally disposed support for storing said $n$ vials in fixed spaced relation, said vials each having shelf integral therewith and extending partially across each vial for reception and storage of respective different ones of $n$ standard radioactive sources each characterized by its ability to produce a known energy spectrum, said shelves each having an upwardly extending lip adjacent one edge thereof, a housing defining a shielded detection chamber, means for indexing said support to successively align each of said $n$ test samples with said detection chamber, means for introducing said test samples into and removing said samples from said chamber one at a time, means supported in said housing and positioned adjacent said chamber for producing output signals proportional to the energy of light scintillations occurring within said chamber, means for recording as $n$ first counts at least certain of the output signals produced, means responsive to return of the last of said $n$ test samples to said support for automatically tilting said support for a predetermined time interval so as to discharge the $n$ standard sources positioned on said shelves over their associated lips and into the scintillator contained within said $n$ vials whereupon light scintillations are created in the liquid scintillator by decay events occurring in both the isotope and the standard radioactive source, and means for recycling said apparatus upon return of said support to its normal horizontal position so as to again introduce said test samples into said chamber one at a time and to record as $n$ second counts at least certain of the output signals produced in each sample as a result of radiations emanating from both said isotope and said radioactive source.

31. Radioactivity spectrometry apparatus for use in analyzing $n$ test samples comprising, in combination, $n$ light transmissive sample vials each adapted to contain a liquid scintillator and a radioactive isotope disposed therein, a normally horizontally disposed support for storing said $n$ vials in fixed spaced relation, said vials each having a shelf integral therewith and extending partially across each vial for reception and storage of respective different ones of $n$ standard radioactive sources each characterized by its ability to produce a known energy spectrum, said shelves each having an upwardly extending lip adjacent one edge thereof, a housing defining a shielded detection chamber, means for indexing said support to successively align each of said $n$ test samples with said detection chamber, means for introducing said test samples into and removing said samples from said chamber one at a time, means supported in said housing and positioned adjacent said chamber for producing output signals proportional to the energy of light scintillations occurring within said chamber, means for recording as $n$ first counts at least certain of the output signals produced, means responsive to return of the last of said $n$ test samples to said support for automatically tilting said support, means for rotating said support a predetermined number of times while tilted so as to discharge the $n$ standard sources positioned on said shelves over their associated lips and into the scintillator contained within said $n$ vials whereupon light scintillations are created in the liquid scintillator by decay events occurring in both the isotope and the standard radioactive source, means for returning said support to its normal horizontal position after said support has rotated said predetermined number of times, and means for recycling said apparatus upon return of said support to its normal horizontal position so as to again introduce said test samples into said chamber one at a time and to record as $n$ second counts at least certain of the output signals produced in each sample as a result of radiations emanating from both said isotope and said radioactive source.

32. Radioactivity spectrometry apparatus for use in analyzing $n$ test samples of the type including a light transmissive sample vial having a liquid scintillator and a radioactive isotope disposed therein, said apparatus comprising, in combination, a housing defining a shielded detection chamber, means for introducing said $n$ test samples into said chamber one at a time, a storage hopper for supporting a plurality of radioactive sources each characterized by its ability to produce a known energy spectrum, said sources supported in disoperative association with respect to said chamber, a passageway formed in said housing and extending from said hopper to the upper end of said detection chamber, means supported in said housing and positioned adjacent said chamber for producing output signals proportional to the energy of light scintillations occurring within said chamber, means for recording as $n$ first counts at least certain of the output signals produced, means responsive to recordation of each of said $n$ first counts for automatically releasing one of said sources from said hopper and introducing the released source into said passageway for gravity discharge into the upper end of said detection chamber where said source is operatively associated with the test sample disposed in said chamber, said recording means adapted to record as $n$ second counts at least certain of the output signals produced by scintillations created by the composite effect of the isotope in each of said $n$ samples and one of said sources, and means for ejecting each of said $n$ test samples from said detection chamber upon recordation of the corresponding one of said $n$ second counts.

33. Radioactivity spectrometry apparatus as set forth in claim 32 further characterized in that said released source is discharged from said passageway directly into the sample vial disposed within said detection chamber.

34. Radioactivity spectrometry apparatus for use in analyzing $n$ test samples of the type including a light transmissive sample vial having a liquid scintillator and a radioactive isotope disposed therein, said vials each having an upwardly facing concavity defining a compartment therein, said apparatus comprising, in combination, a housing defining a shielded detection chamber, means for introducing said $n$ test samples into said chamber one at a time, a storage hopper for supporting a standard radioactive source of penetrating radiations characterized by its ability to produce a known energy spectrum, said standard source supported in disoperative association with respect to said chamber, a passageway formed in said housing and extending from said hopper to the upper end of said detection chamber, means supported in said housing and positioned adjacent said chamber for producing output signals proportional to the energy of light scintillations occurring within said chamber, means for recording as $n$ first counts at least certain of the output signals produced, means responsive to recordation of each of said $n$ first counts for automatically releasing said standard source from said hopper and introducing the released source into said passageway for gravity discharge into the upper end of said detection chamber where said source is received within the compartment in the particular sample vial disposed in said chamber, said recording means adapted to record as $n$ second counts at least certain of the output signals produced by scintillations created by the composite effect of the isotope in each of said $n$ samples and said standard source, means for ejecting each of said $n$ test samples from said detection chamber upon recordation of the corresponding one of said $n$ second counts, and means for retrieving said standard radioactive source from the compartments in each of said $n$ vials upon ejection of said vials from said detection chamber and for returning said source to said hopper where said source is disoperatively associated with the next sample introduced into said chamber.

35. Radioactivity spectrometry apparatus for use in analyzing $n$ test samples of the type including a light transmissive sample vial having a liquid scintillator and a radioactive isotope disposed therein, said apparatus comprising, in combination, a housing defining a shielded detection chamber, means for introducing said $n$ test samples into said chamber one at a time, means for supporting a standard radioactive source of penetrating radiations for selective movement between a first position remote from said chamber and a second position operatively associated with said chamber, said standard source characterized by its ability to produce a known energy spectrum, means supported in said housing and positioned adjacent said chamber for producing output signals proportional to the energy of light scintillations occurring within said chamber, means for recording as $n$ first counts at least certain of the output signals produced, means responsive to recordation of each of said $n$ first counts for automatically shifting said standard source from one to the other of said first and second positions, said recording means adapted to record as $n$ second counts at least certain of the output signals produced, one of said $n$ first and second counts being representative of scintillations produced by the isotope when said standard source is in its first position and the other of said $n$ first and second counts being representative of scintillations created by the composite effect of the isotope in each of said $n$ samples and said standard source when the latter is in its second position, means responsive to recordation of each of said $n$ second counts for automatically shifting said standard source from one to the other of said second and first positions, and means for ejecting each of said $n$ test samples from said detection chamber upon recordation of the corresponding one of said $n$ second counts.

36. Radioactivity spectrometry apparatus for use in analyzing a test sample of the type including a light transmissive sample vial having a liquid scintillator and a radioactive isotope disposed therein said apparatus comprising, in combination, a housing defining a shielded detection chamber, means for introducing said test sample into said chamber, means supported in said housing and positioned adjacent said chamber for producing output signals proportional to the energy of light scintillations occurring within said chamber, a conduit mounted in said housing and terminating adjacent one end in a first internal shoulder positioned adjacent said chamber, the opposite end of said conduit terminating in a second internal shoulder at a point remote from said chamber, a standard radioactive source of penetrating radiations disposed in said conduit, said standard radioactive source characterized by its ability to produce a known energy spectrum, a source of pressurized fluid, a control valve for selectively and alternately coupling the opposite ends of said conduit to said fluid source for selectively shifting said standard radioactive source into engagement with one of said first and second internal shoulders, means for recording as a first count at least certain of the output signals produced when said standard radioactive source is engaged with one of said first and second shoulders, means responsive to recordation of said first count for shifting said control valve to couple said fluid source to a selected one of the ends of said conduit for shifting said radioactive source into engagement with the other of said first and second shoulders, said recording means adapted to record as a second count at least certain of the output signals produced when said standard radioactive source is engaged with the other of said first and second shoulders, and means for ejecting said sample from said chamber incident to recordation of said second count.

References Cited by the Examiner
UNITED STATES PATENTS

| | | | |
|---|---|---|---|
| 1,775,279 | 9/30 | Graham | 215—74 X |
| 2,690,861 | 10/54 | Tupper | 215—74 X |
| 2,886,208 | 5/59 | Sinclair | 206—42 X |
| 3,004,556 | 10/61 | Raimo | 206—42 |
| 3,027,000 | 3/62 | Kantrow | 206—42 |
| 3,095,085 | 6/63 | Meijer | 206—42 |

OTHER REFERENCES

Studies of Low-Level Liquid Scintillation Counting of Tritium, by W. J. Kaufman et al., from Proceedings of the Universitiy of New Mexico Conference on Organic Scintillation Detectors, August 1960, pages 239 to 259.

Elevator and Index Mechanism Handle Samples in Radiation Detector, by L. G. Soderholm, reprint from August 4, 1961 issue of Design News, 2 pages.

RALPH G. NILSON, *Primary Examiner.*